(12) United States Patent
Sun et al.

(10) Patent No.: US 12,216,877 B2
(45) Date of Patent: Feb. 4, 2025

(54) TRIBORESISTIVE TOUCH SENSOR

(71) Applicant: SEOUL NATIONAL UNIVERSITY R&DB FOUNDATION, Seoul (KR)

(72) Inventors: Jeong-Yun Sun, Seoul (KR); Younghoon Lee, Gwangmyeong-si (KR); Sungsoo Lim, Incheon (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 303 days.

(21) Appl. No.: 17/955,604

(22) Filed: Sep. 29, 2022

(65) Prior Publication Data

US 2023/0067719 A1 Mar. 2, 2023

Related U.S. Application Data

(63) Continuation of application No. PCT/KR2022/007923, filed on Jun. 3, 2022.

(30) Foreign Application Priority Data

Aug. 25, 2021 (KR) .................. 10-2021-0112275

(51) Int. Cl.
G06F 3/045 (2006.01)
H02N 1/04 (2006.01)

(52) U.S. Cl.
CPC .............. *G06F 3/045* (2013.01); *H02N 1/04* (2013.01)

(58) Field of Classification Search
None
See application file for complete search history.

(56) References Cited

U.S. PATENT DOCUMENTS

| | | | | |
|---|---|---|---|---|
| 5,633,700 A | * | 5/1997 | Peck | G01R 29/12 399/73 |
| 9,429,597 B1 | * | 8/2016 | Bierer | G01R 19/2503 |
| 2006/0061447 A1 | * | 3/2006 | Zannini | H01F 29/10 336/234 |
| 2009/0256429 A1 | * | 10/2009 | Fan | H02K 53/00 310/25 |
| 2013/0285970 A1 | * | 10/2013 | Ahn | G06F 3/045 324/705 |
| 2015/0048846 A1 | | 2/2015 | Post | |
| 2016/0188055 A1 | * | 6/2016 | Wang | G06F 3/04166 345/174 |

(Continued)

FOREIGN PATENT DOCUMENTS

EP 3035398 A1 6/2016
EP 3562025 A1 10/2019

(Continued)

OTHER PUBLICATIONS

Yong Min Kim et al., Stimuli-Responsive Smart Electrochemical Devices based on Functional Ion Gels, Polymer Science and Technology vol. 31, No. 1, Feb. 2020.

(Continued)

*Primary Examiner* — Fred Tzeng
(74) *Attorney, Agent, or Firm* — Shih IP Law Group, PLLC.

(57) ABSTRACT

The present disclosure relates to a triboresistive touch sensor capable of generating electric power by electrification and electrostatic induction, and thus sensing a touch position without a grid.

19 Claims, 26 Drawing Sheets

(56) References Cited

U.S. PATENT DOCUMENTS

| | | | |
|---|---|---|---|
| 2017/0292972 A1* | 10/2017 | France | G01R 31/3278 |
| 2018/0372666 A1* | 12/2018 | Chou | G01R 29/24 |
| 2020/0183511 A1* | 6/2020 | Frescas | H02N 1/04 |
| 2022/0314519 A1* | 10/2022 | Falciano | B29C 35/0288 |

FOREIGN PATENT DOCUMENTS

| | | |
|---|---|---|
| JP | 2016-018420 A | 2/2016 |
| KR | 10-2016-0071367 A | 6/2016 |
| KR | 10-1768648 B1 | 8/2017 |
| KR | 10-2017-0126178 A | 11/2017 |
| KR | 10-1824800 B1 | 2/2018 |
| KR | 10-1884395 B1 | 8/2018 |
| KR | 10-2129527 B1 | 7/2020 |
| KR | 10-2021-0087377 A | 7/2021 |
| WO | 2018211314 A1 | 11/2018 |

OTHER PUBLICATIONS

European Search Report of EP application No. 22 764 293.1, dated Mar. 21, 2024.

\* cited by examiner

[FIG. 1A(i)]
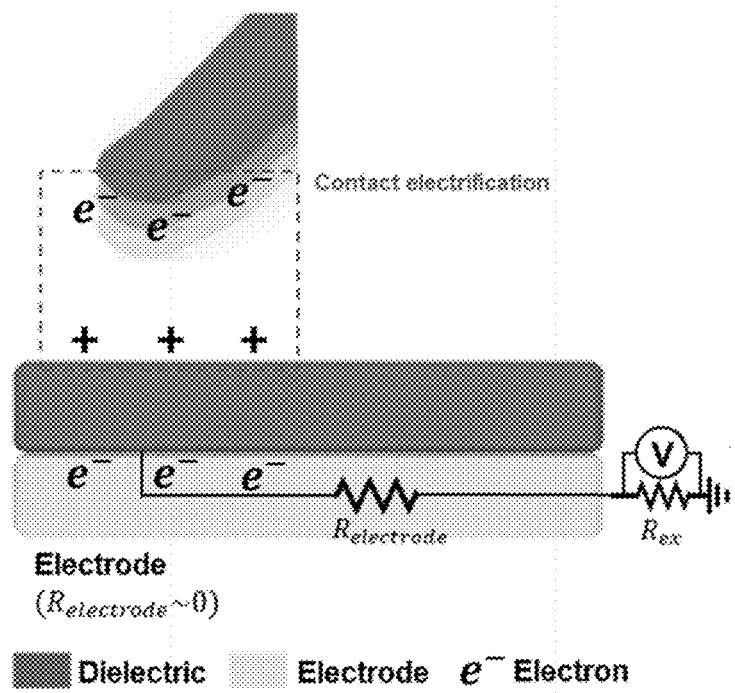
[FIG. 1A(ii)]
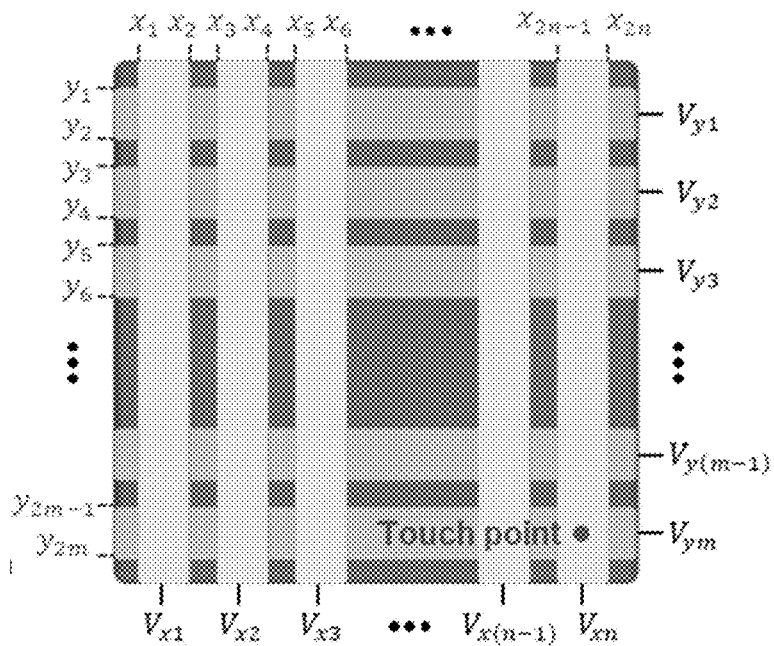

[FIG. 1B(i)]
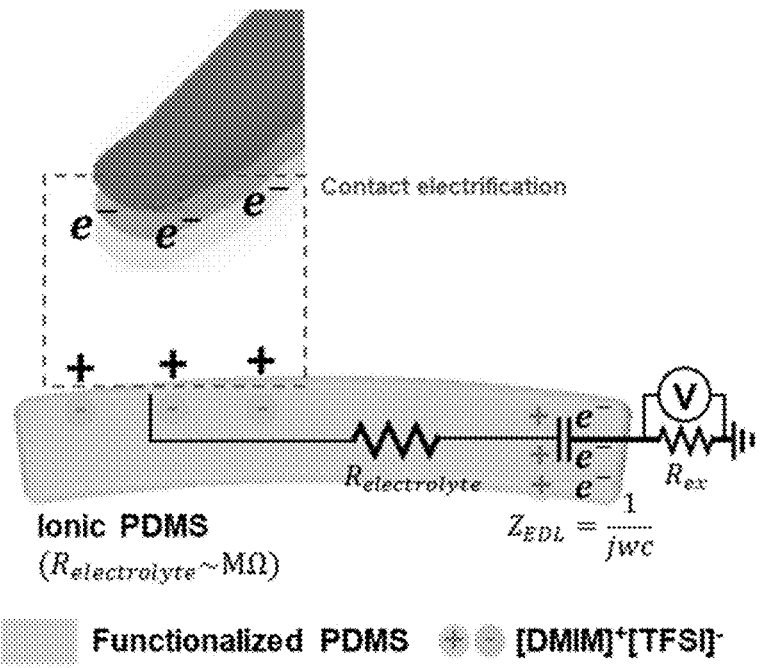
[FIG. 1B(ii)]
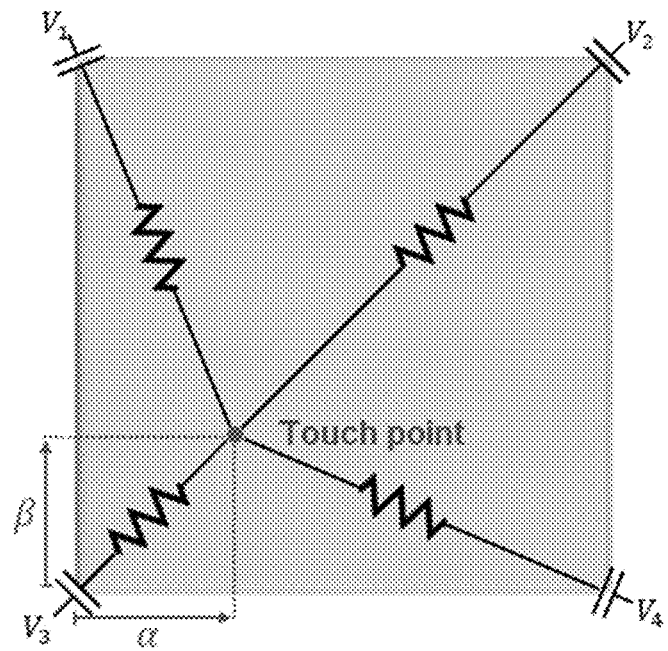

[FIG. 2A]
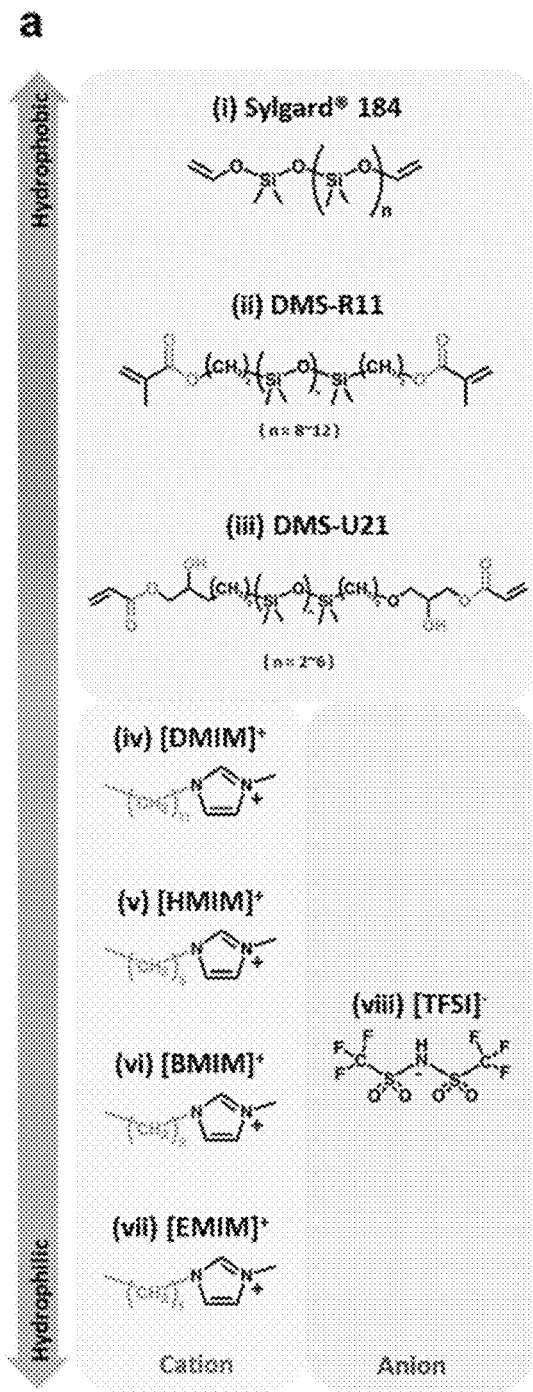

[FIG. 2B(i)]
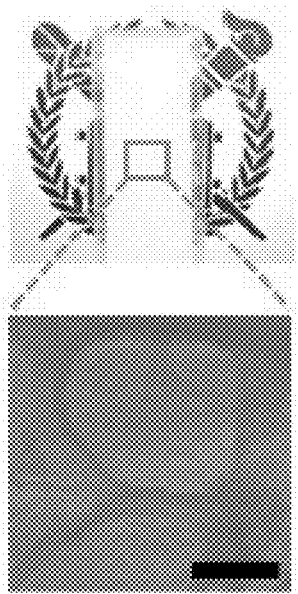
[FIG. 2B(ii)]
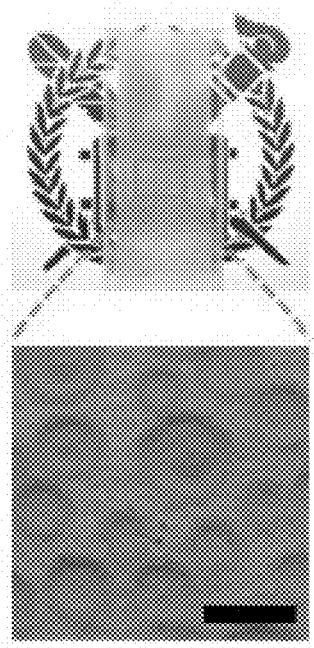

[FIG. 2B(iii)]
[FIG. 2C]
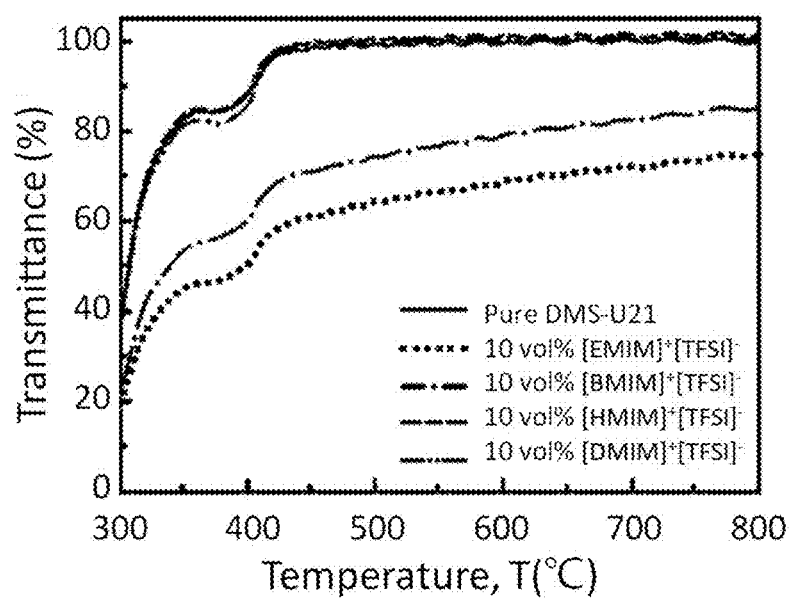

[FIG. 2D]
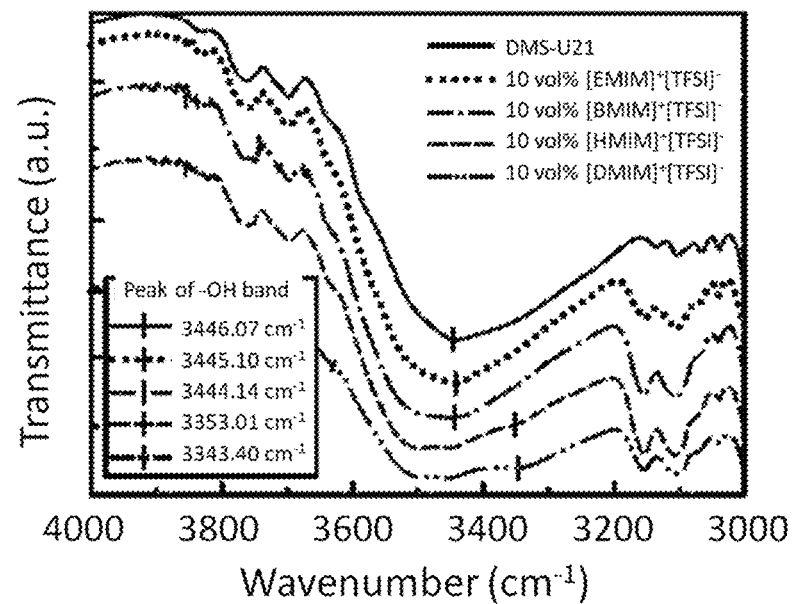
[FIG. 2E]
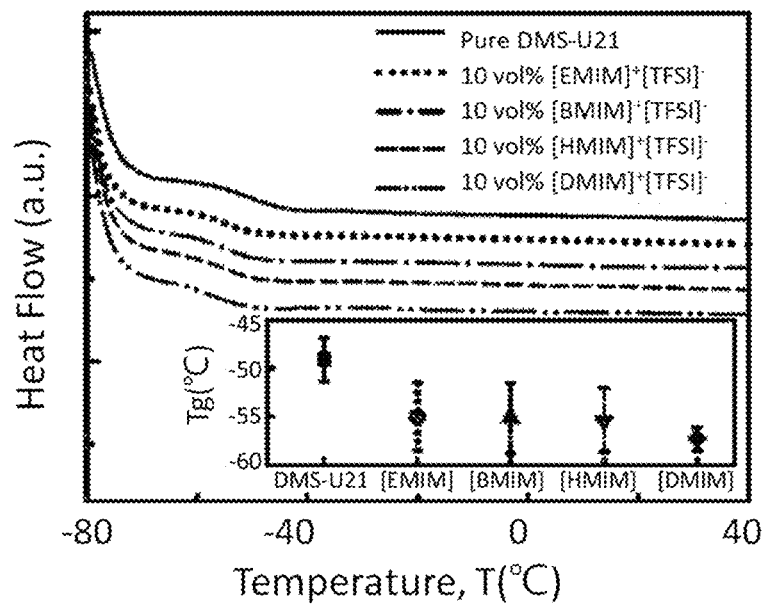

[FIG. 2F]
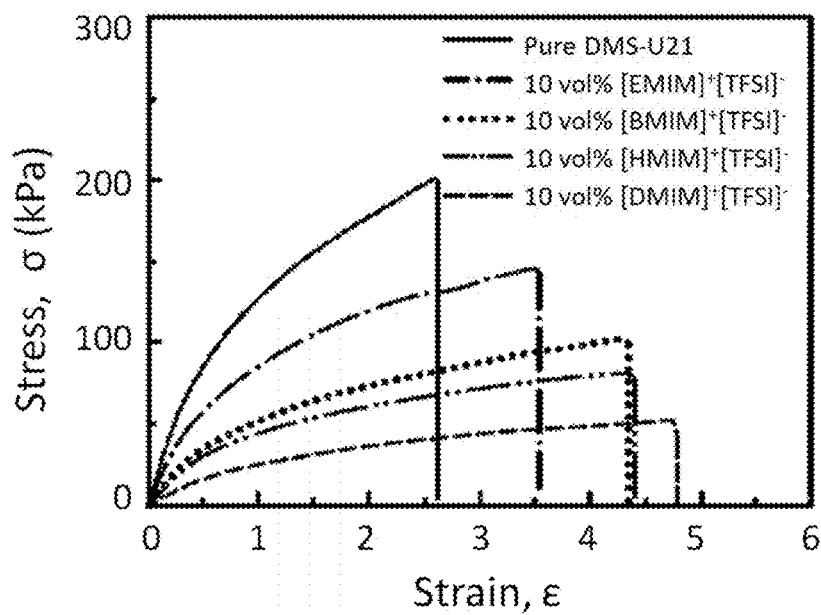
[FIG. 2G]
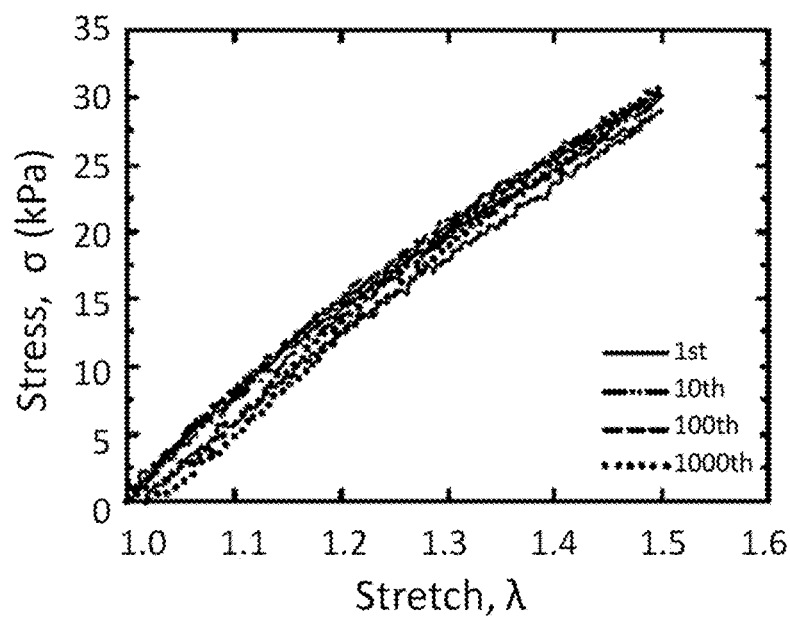

[FIG. 2H]
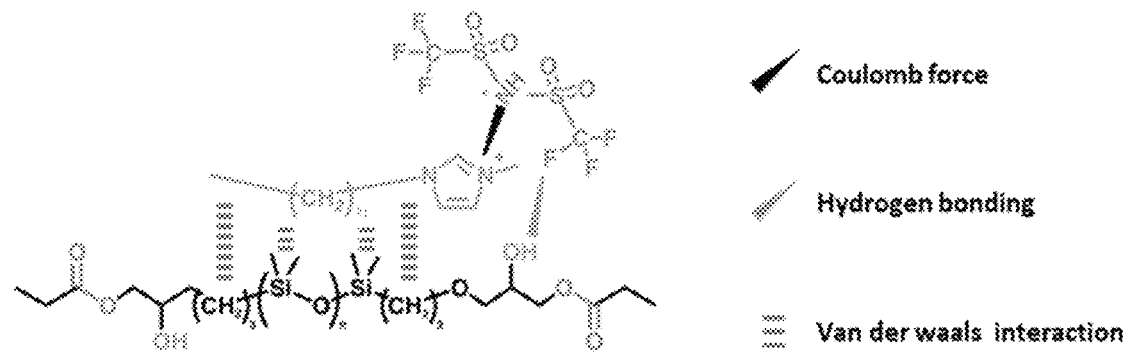
[FIG. 3]
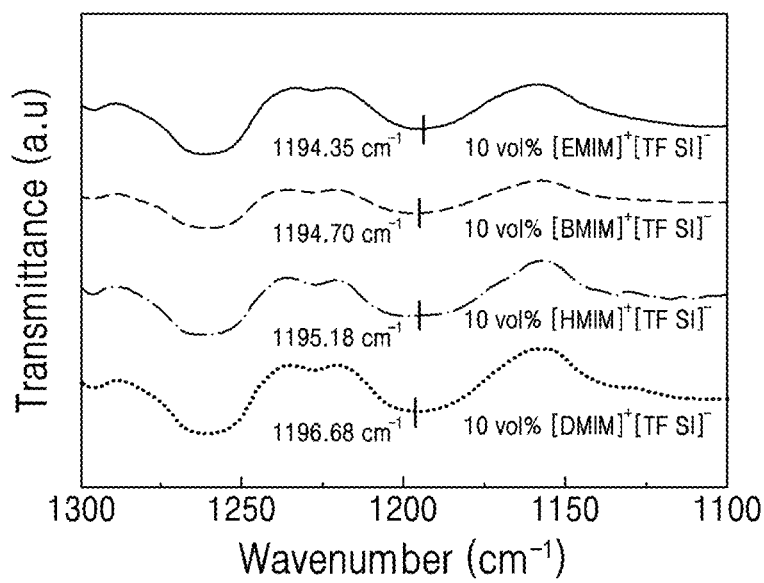

[FIG. 4A]
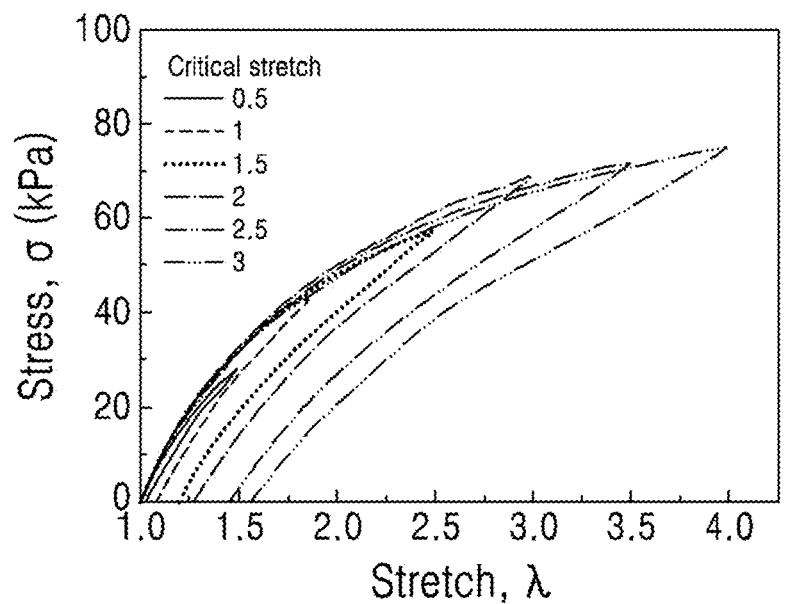
[FIG. 4B]
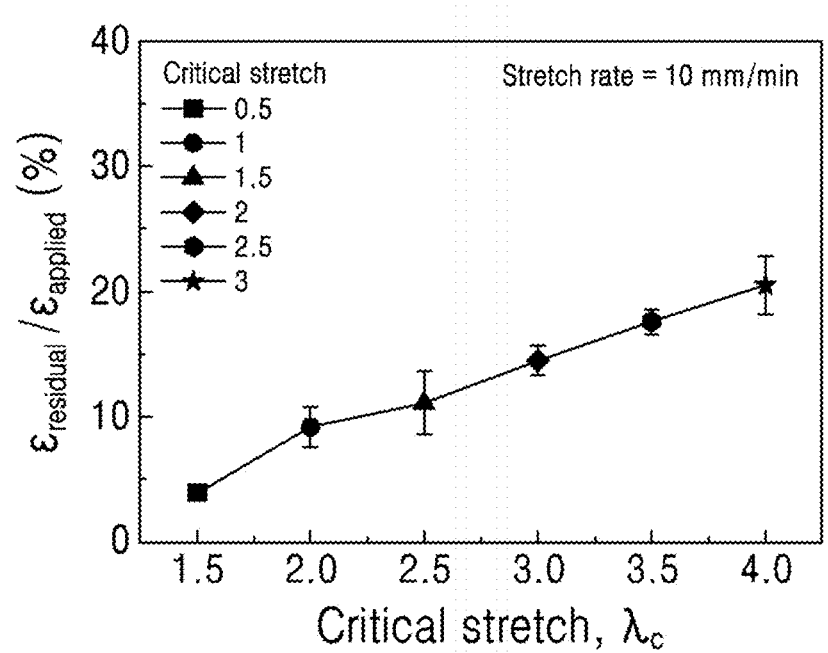

[FIG. 5A]
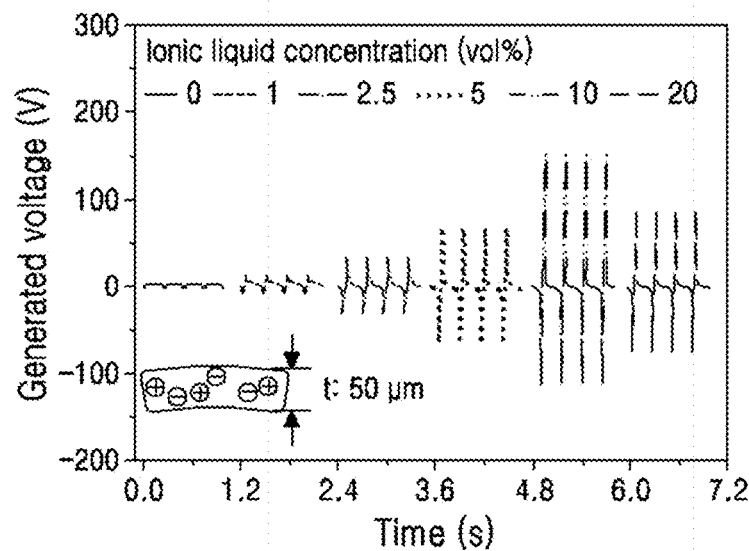
[FIG. 5B]
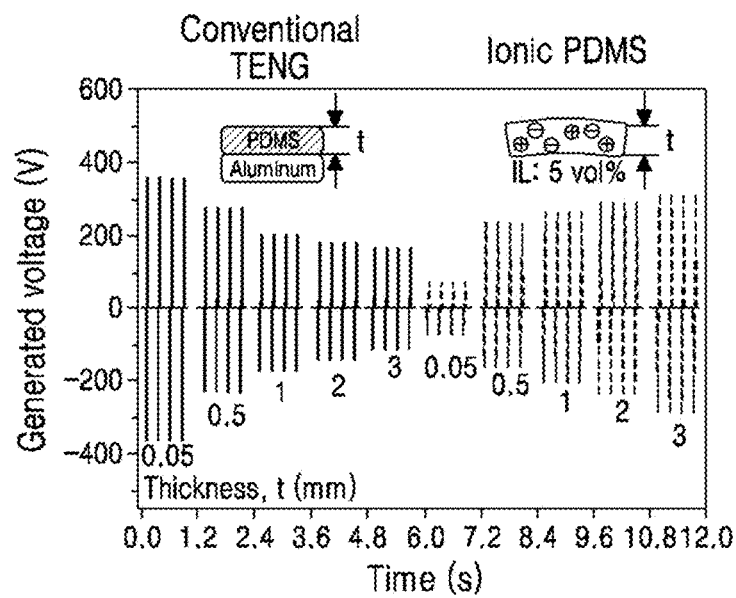

[FIG. 5C]
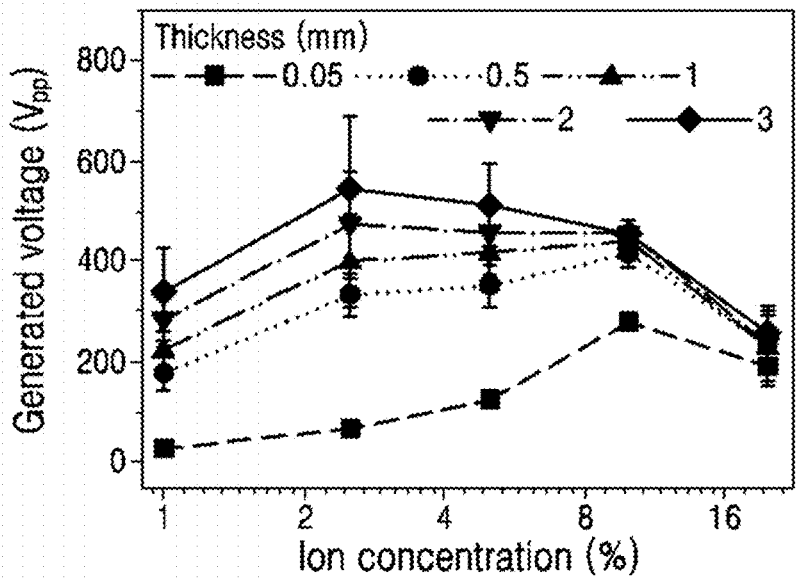
[FIG. 5D]
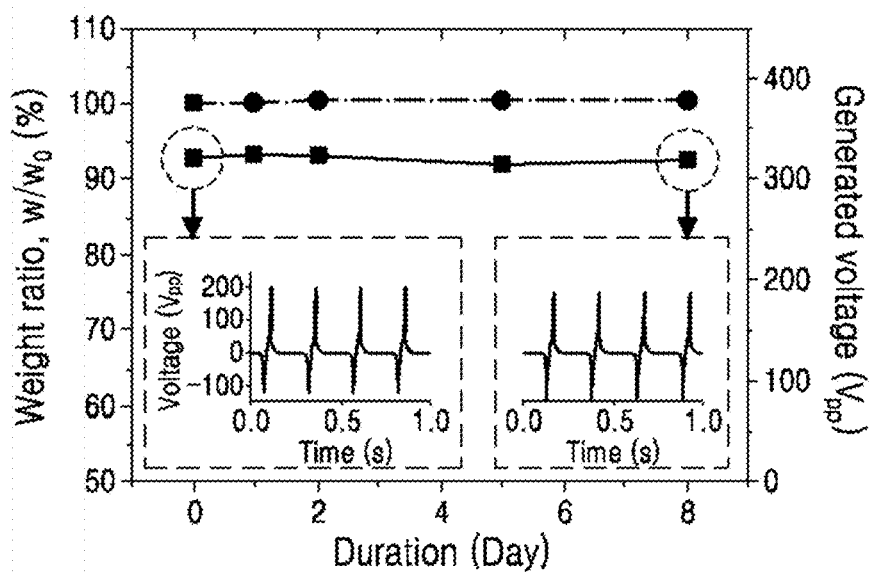

[FIG. 5E]
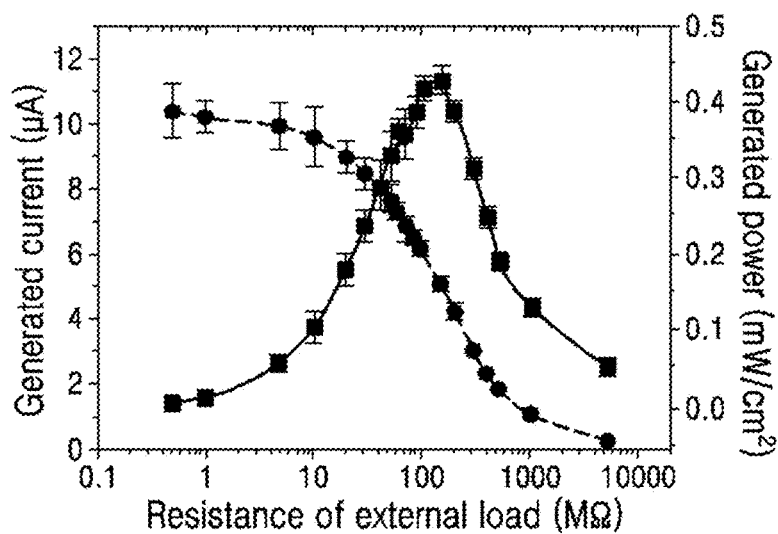
[FIG. 5F]
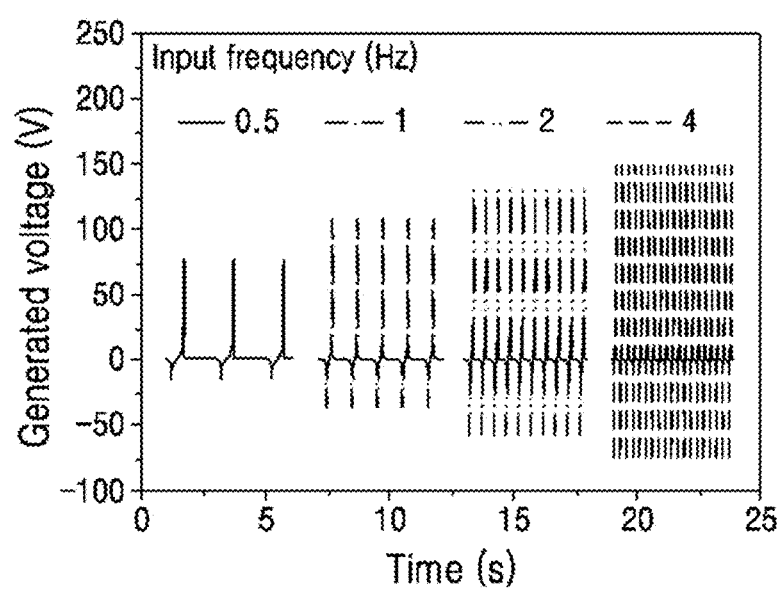

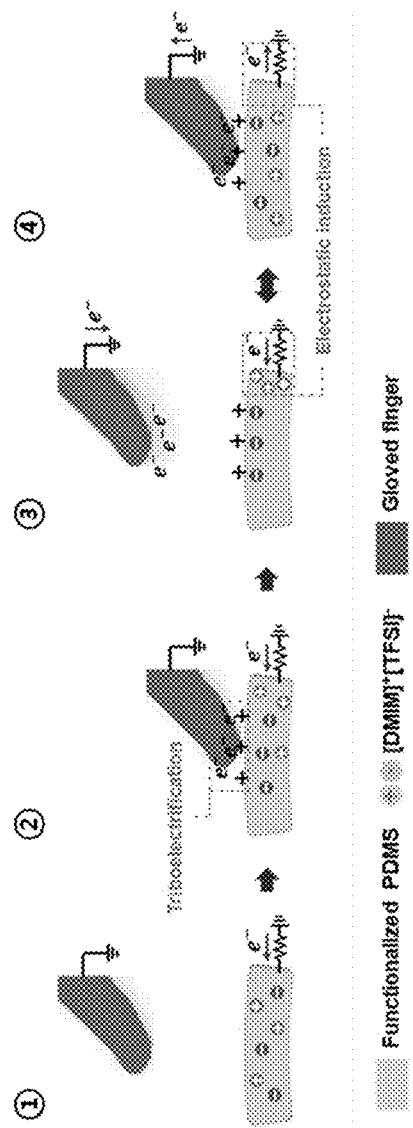
[FIG. 6]

[FIG. 7A]
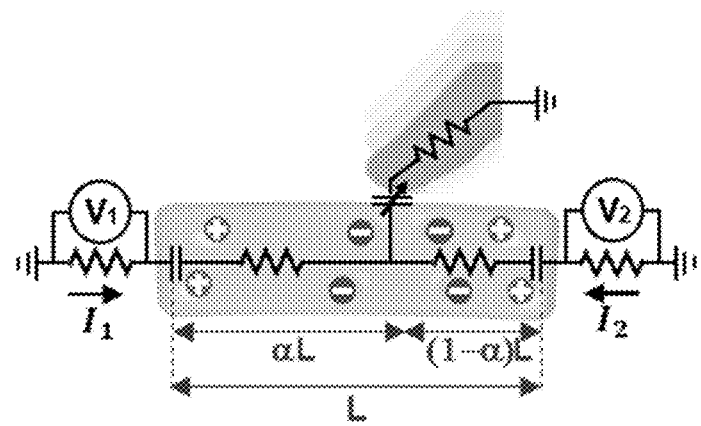
[FIG. 7B(i)]
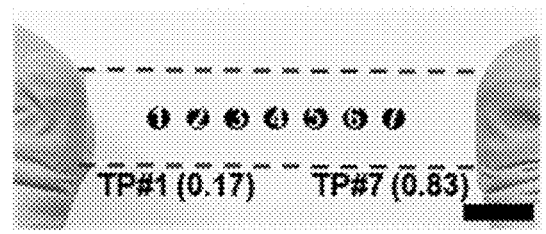
[FIG. 7B(ii)]
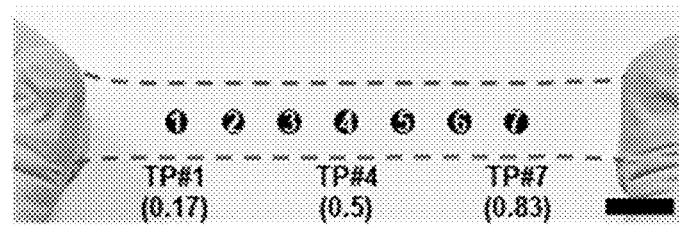

[FIG. 7C]
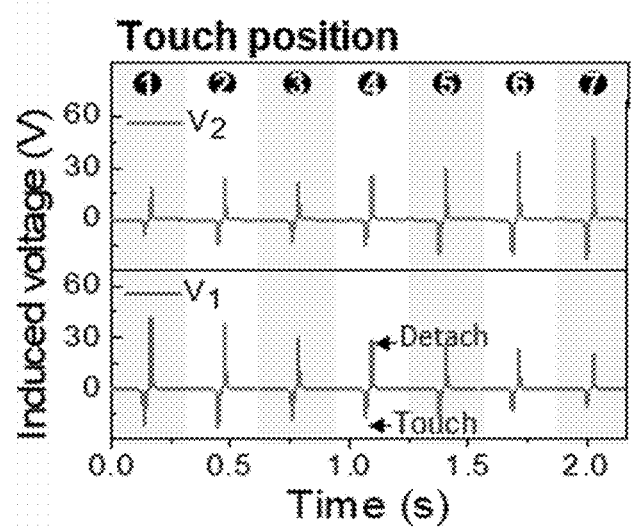
[FIG. 7D]
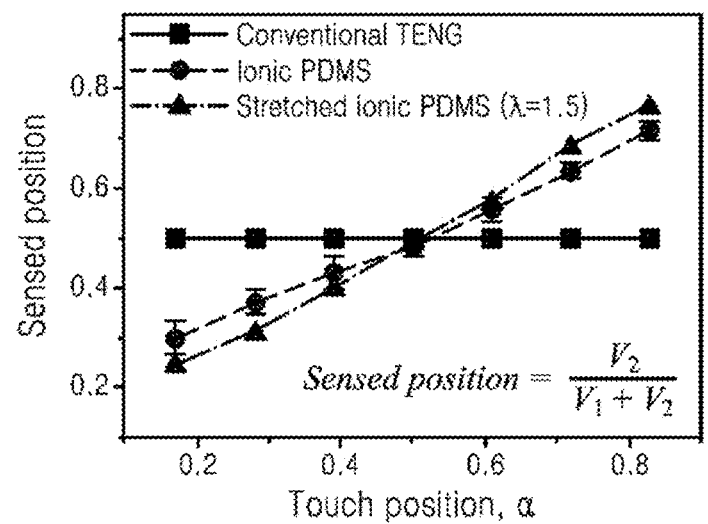

[FIG. 7E]
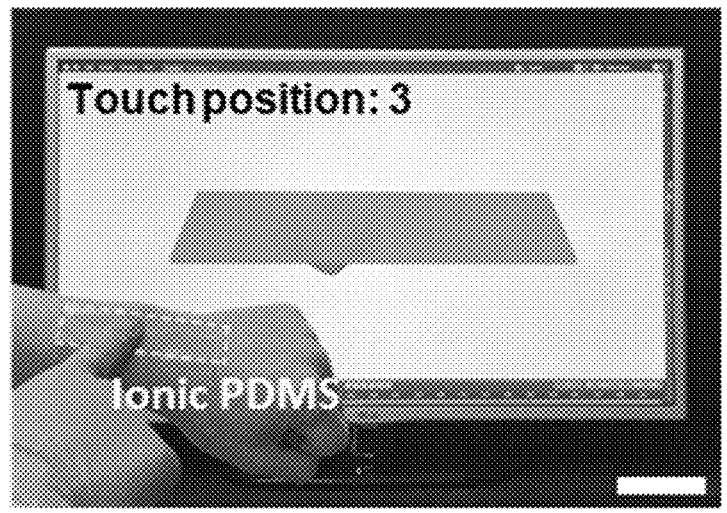
[FIG. 7F]
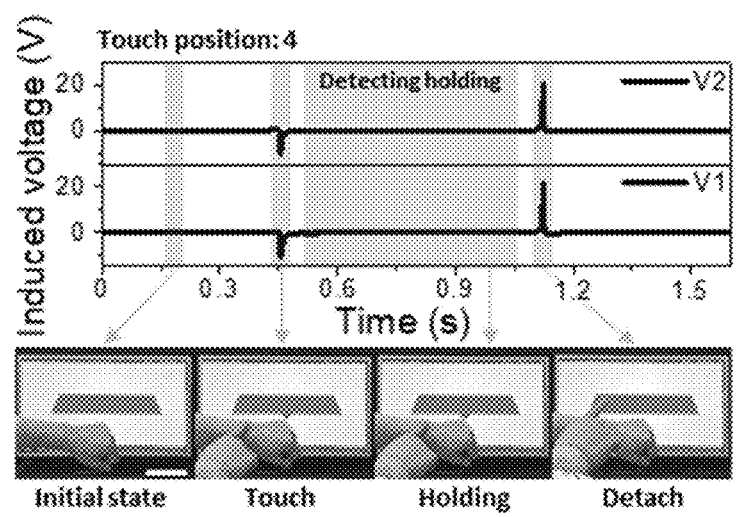

[FIG. 8A]
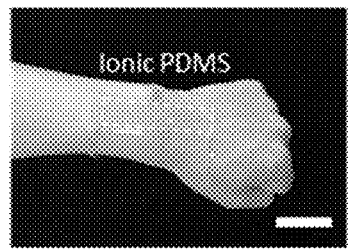
<Initial state>
[FIG. 8B]
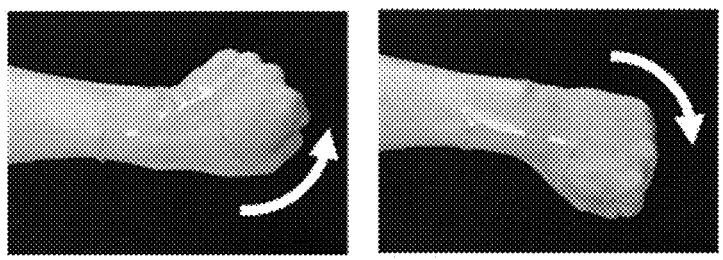
<Bending>
[FIG. 8C]
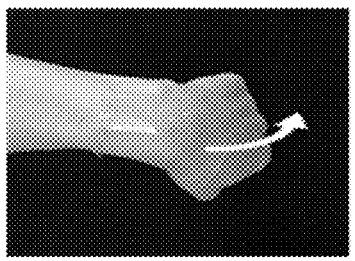
<Stretching>

[FIG. 8D]
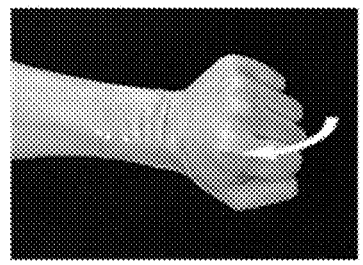
<Contraction>
[FIG. 9A]
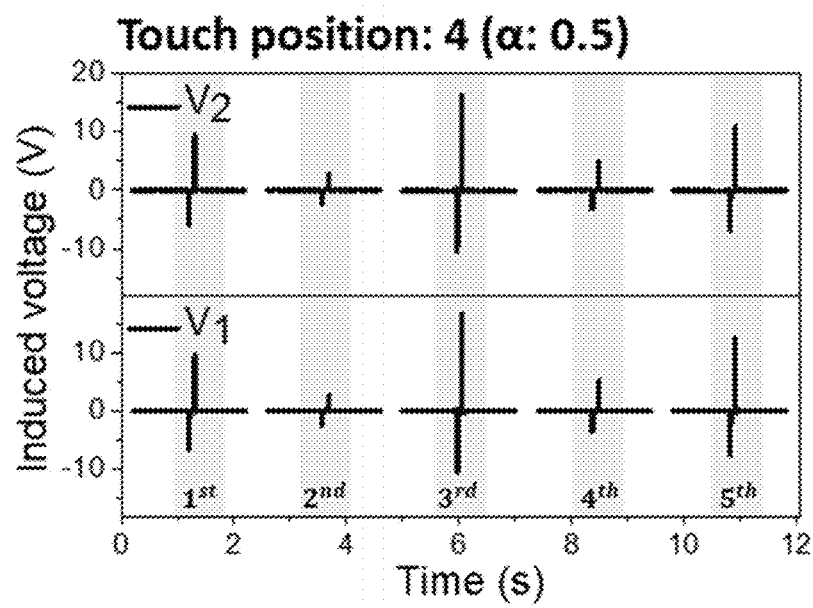

[FIG. 9B]
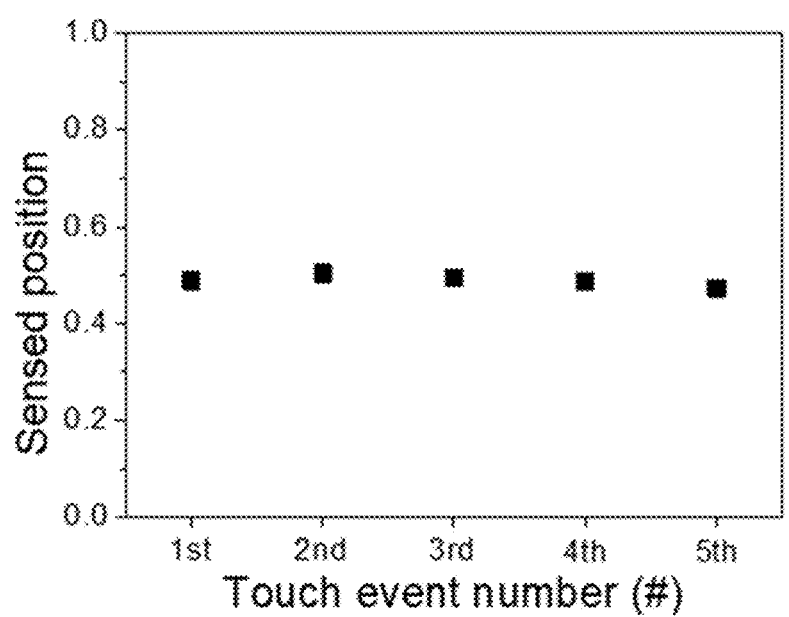

[FIG. 10]
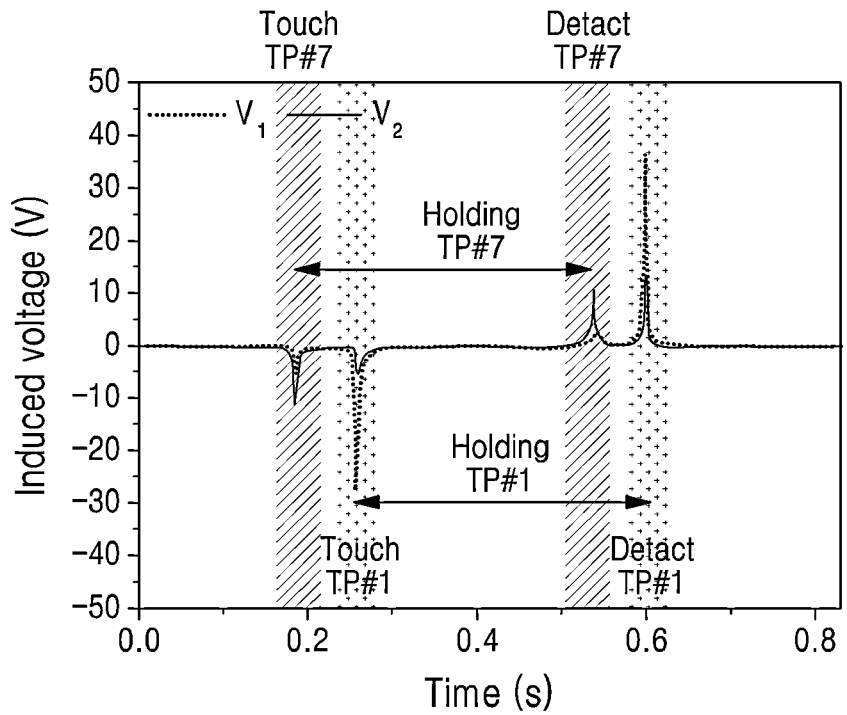
[FIG. 11]
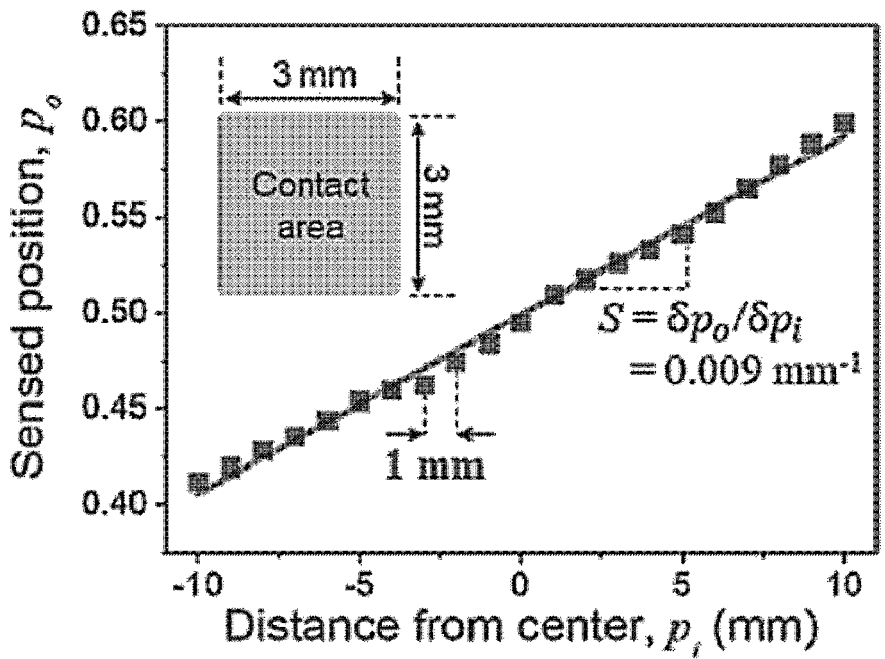

[FIG. 12]
[FIG. 13A]
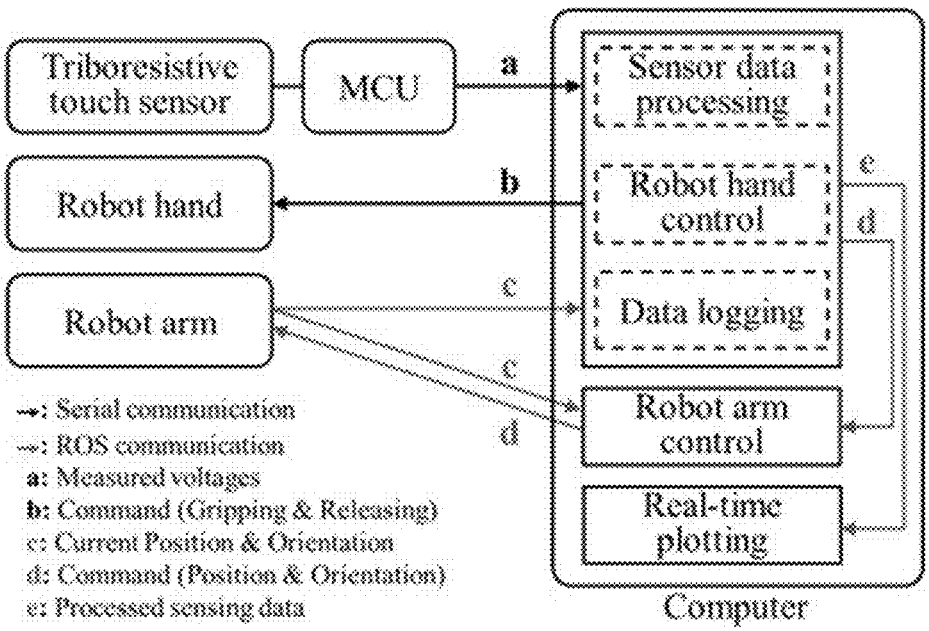

[FIG. 13B]
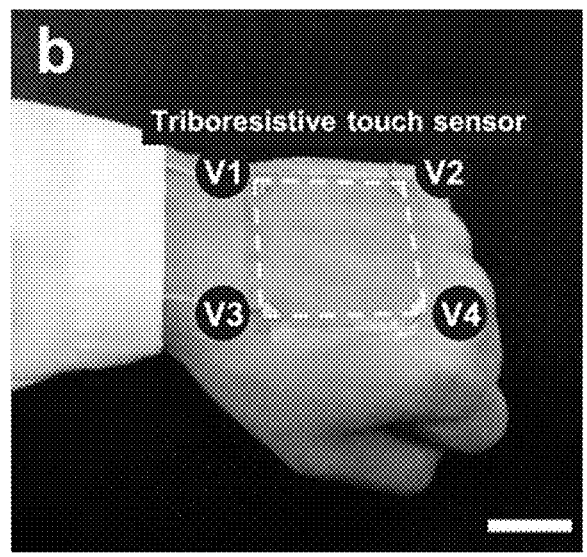
[FIG. 13C]
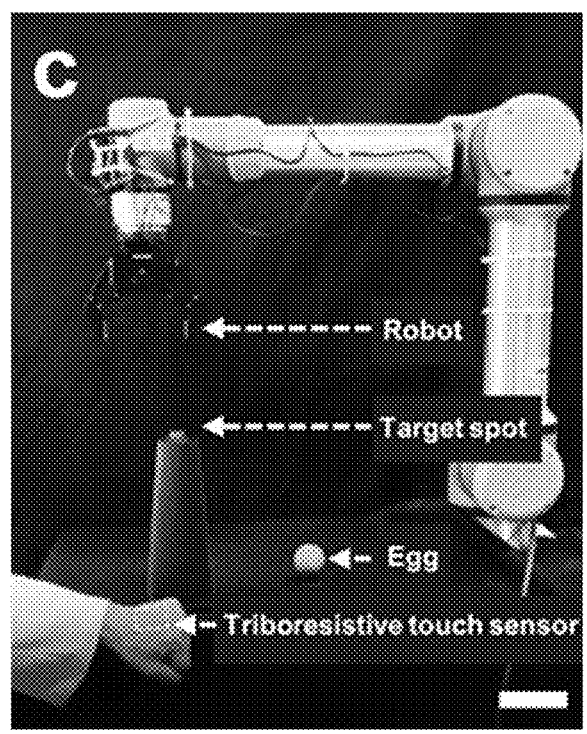

[FIG. 13D(i)]
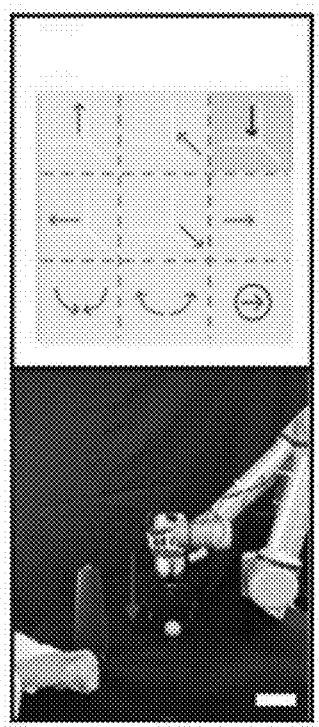
[FIG. 13D(ii)]
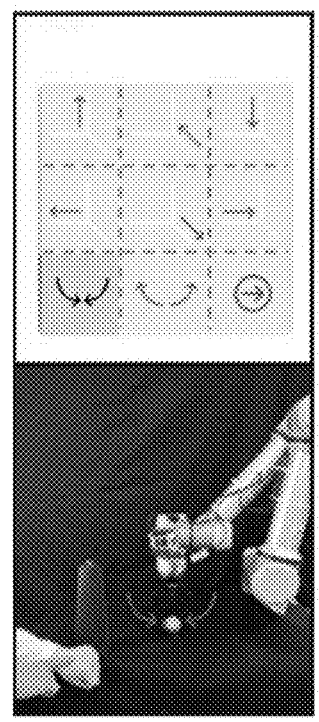

[FIG. 13D(iii)]
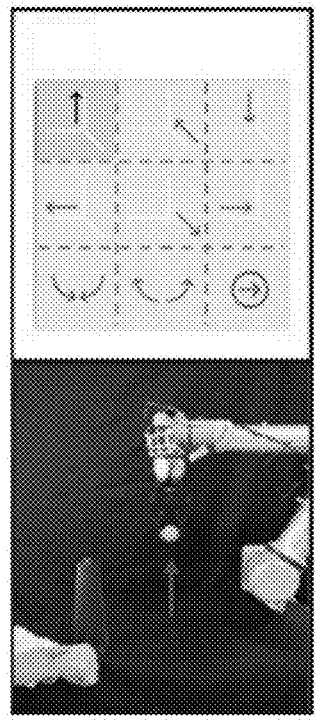
[FIG. 13D(iv)]
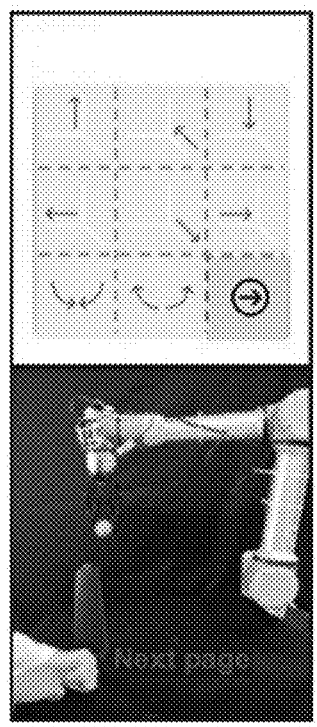

[FIG. 13D(v)]
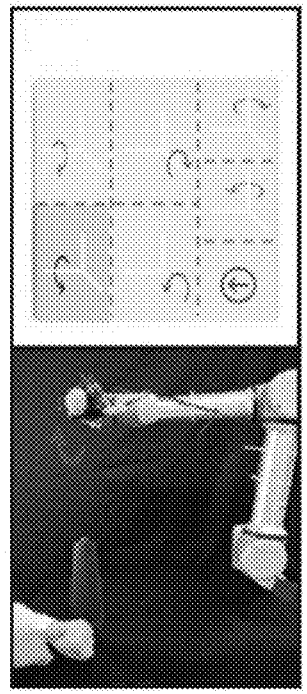
[FIG. 13D(vi)]
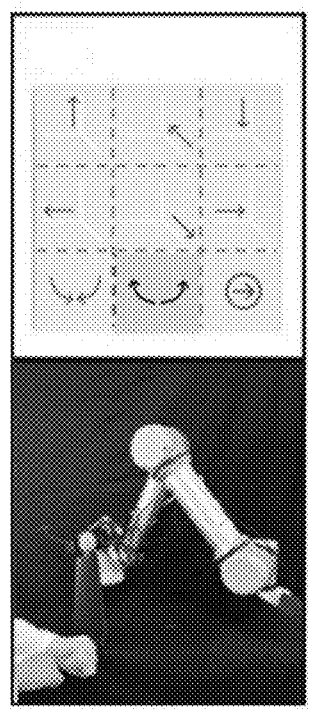

[FIG. 13E]
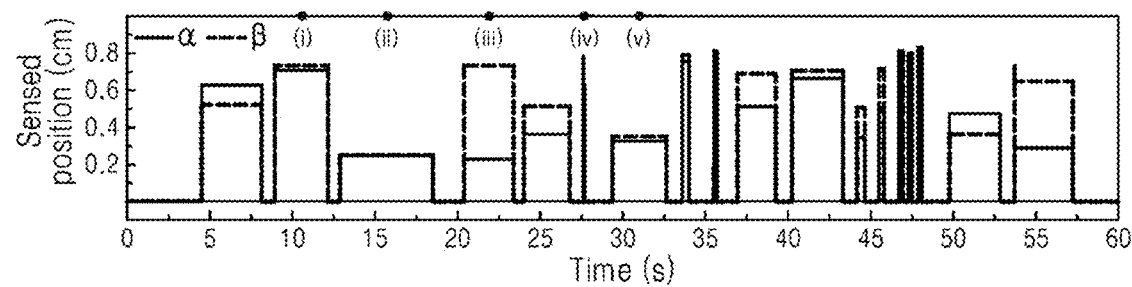
[FIG. 13F]
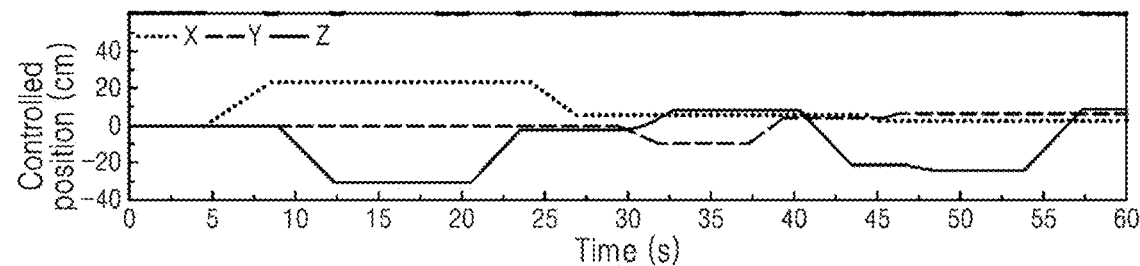

TRIBORESISTIVE TOUCH SENSOR

CROSS-REFERENCE TO RELATED APPLICATIONS

This application is a continuation of PCT Application No. PCT/KR2022/007923, filed on Jun. 3, 2022, which claims priority to Korean Patent Application Number 10-2021-0112275, filed on Aug. 25, 2021, both of which are hereby incorporated by reference in their entirety.

TECHNICAL FIELD

The present disclosure relates to a triboresistive touch sensor capable of generating electric power by electrification and electrostatic induction, and thus sensing a touch position without a grid.

BACKGROUND

The advent of wireless sensor networks has inspired rapid development of detection systems for seamless interaction with electronic devices. In particular, touch sensing systems based mostly on the principles of capacitive and piezoresistive touch sensing mechanisms, such as touchpads and touch screens, have played important roles in diverse electronic devices (i.e. smartphones, watches, tablets, etc.). Recently, to communicate accurate information and provide convenience, sensing systems have been applied directly to the human body. Owing to the soft and curved nature of human skin, such sensing systems must be flexible, robust, and transparent to ensure operational reliability and comfort. However, it has been challenging to ensure these desirable properties due to the complicated structures of conventional touch sensing systems, which contain a network of individual electrodes and stacked multi-layers. More importantly, sensing systems inevitably rely on external power sources, which potentially sacrifice flexibility, add weight, and decrease the lifetime of the sensing systems.

To address the issues originating from the use of external power sources, systems that rely on energy-harvesting technologies have been highlighted as an alternative to conventional touch sensing systems. Recently, triboelectric nanogenerators (TENGs), which convert mechanical touch to electrical energy, have been developed to provide a platform for touch sensing capability that does not rely on additional power sources. The self-powered touch sensing capability of TENGs can be realized with a couple of materials, i.e., a dielectric layer attached to a conducting layer, based on the combined effects of contact electrification and electrostatic induction. To ensure that triboelectric touch sensors are skin-mountable, researchers have worked to make the components stretchable and transparent. Soft materials such as poly(dimethylsiloxane) (PDMS) and ionically conductive gels are suitable for use in skin-mountable triboelectric touch sensors thanks to their high transparency, stretchability, resilience, and easily tunable mechanical properties.

Nonetheless, the development of triboelectric touch position sensors with reliable stretchability and transparency remains challenging due to the complicated structures of the sensors, which contain multiple stacked layers and arrays of individual electrodes. Also, the stacking process deteriorates the outstanding mechanical/optical properties of the soft materials in TENGs since the sensors require an additional conducting layer of a material such as metal, ceramic, carbon materials, etc. The inclusion of transparent and stretchable materials like gels also results in easy delamination and blurring at the bonding interfaces. Relying on a complex array of individual electrodes to sense touch position worsens the deformability of the sensors, which can be limited by an unstable interface originating from the different elastic moduli of the materials and poor interfacial adhesion. The bonding interface may also cause diffraction of light, which harms the transparency of the sensor. Furthermore, under applied deformation, the distance between individual electrodes in the array increases, resulting in degradation of sensing resolution.

PRIOR ART DOCUMENT

Korean Patent Laid-open Publication No. 10-2021-0087377.

DISCLOSURE OF THE INVENTION

Problems to be Solved by the Invention

The present disclosure provides a triboresistive touch sensor capable of generating electric power by electrification and electrostatic induction, and thus sensing a touch position without a grid.

However, problems to be solved by the present disclosure are not limited to the above-described problems. Although not described herein, other problems to be solved by the present disclosure can be clearly understood by those skilled in the art from the following descriptions.

Means for Solving the Problems

A first aspect of the present disclosure provides a triboresistive touch sensor, including a conductor in which electrification and electrostatic induction are caused by an external touch; and at least two voltmeters or ammeters provided at corners of the conductor.

Effects of the Invention

In the triboresistive touch sensor according to embodiments of the present disclosure, electrification and electrostatic induction are caused by an external touch, and, thus, electric power can be generated without introduction of external electricity.

In the triboresistive touch sensor according to embodiments of the present disclosure, the ratio of voltages or currents induced at the voltmeters or the ammeters, respectively, by the electric power can be directly used for sensing a touch position. Thus, a position can be accurately measured regardless of touch speed and a high resolution of touch position sensing can be achieved.

In the triboresistive touch sensor according to embodiments of the present disclosure, a conductor having a monolayered structure can sense a touch position. The triboresistive touch sensor does not include a conductive layer, a separate electrode, a grid and an external power source, which are included in a conventional touch sensor. Therefore, the triboresistive touch sensor is transparent, thin and highly stretchable and elastic. Also, the triboresistive touch sensor is excellent in deformability.

The ionic conductive polymer according to embodiments of the present disclosure includes a polymer compound modified with a hydrophilic functional group and an ionic liquid containing an anion and a cation modified with a hydrophobic functional group. Thus, the polymer compound and the ionic liquid are mixed with excellent homogeneity and miscibility due to hydrogen bonding and van der Waals interaction.

BRIEF DESCRIPTION OF THE DRAWINGS

FIG. 1A (i) and FIG. 1A (ii) show schematic diagrams of a structure (FIG. 1A (i)) and working mechanism (FIG. 1A (ii)) of conventional triboelectric nanogenerators (TENGs).

FIG. 1B (i) and FIG. 1B (ii) show schematic diagrams of a structure (FIG. 1B (i)) and working mechanism (FIG. 1B (ii)) of a triboresistive touch sensor according to an embodiment of the present disclosure.

FIG. 2A shows chemical structures of polydimethylsiloxane (PDMS) family (I to III); chemical structures of a series of 1-alkyl-3-methylimidazolium ($[C_nMIM]^+$) (n=2, 4, 6, and 12) (IV to VII); and a chemical structure of bis(trifluoro-methylsulfonyl)imide ($[TFSI]^-$) which is a pair of a series of $[C_nMIM]^+$ (VII) according to an example of the present disclosure.

FIG. 2B(i) to FIG. 2B(iii) show images of each type of PDMS (Sylgard 184 (FIG. 2B(i)), DMS-R11 (FIG. 2B(ii)), and DMS-U21 (FIG. 2B(iii))) mixed with 10 vol % of 1-Dodecyl-3-methylimidazolium bis(trifluoromethylsulfonyl)imide ($[DMIM]^+[TFSI]^-$) (scale bar: 50 μm) according to an example of the present disclosure.

FIG. 2C to FIG. 2E show UV-Vis transmittance spectra (FIG. 2C), FT-IR spectra (FIG. 2D), and differential scanning calorimetry (DSC) traces (FIG. 2E) of pure DMS-U21 and DMS-U21 mixed with 10 vol % of $[C_nMIM]^+([TFSI]^-$ according to an example of the present disclosure.

FIG. 2F shows tensile stress-strain curves of DMS-U21 mixed with 0 vol % to 20 vol % of $[DMIM]^+ [TFSI]^-$ according to an example of the present disclosure.

FIG. 2G shows stress-stretch curves of DMS-U21 mixed with 10 vol % $[DMIM]^+[TFSI]^-$ during 1000 cycles of loading-unloading under a strain of 0.5 (stretch of 1.5) according to an example of the present disclosure.

FIG. 2H shows a chemical structure illustrating interactions between DMS-U21 and $[DMIM]^+[TFSI]^-$ according to an example of the present disclosure.

FIG. 3 shows FT-IR spectra of pure DMS-U21 and DMS-U21 containing 10 vol % $[C_nMIM]^+[TFSI]^-$ according to an example of the present disclosure.

FIG. 4A and FIG. 4B show one-time loading-unloading curves of DMS-U21 mixed with 10 vol % $[DMIM]^+[TFSI]^-$ under a stretch of 1.5, 2.0, 2.5, 3.0, 3.5, and 4.0 (FIG. 4A) and plastic strain ($\varepsilon_{residual}/\varepsilon_{applied}$) as a function of critical stretch by using resilience in FIG. 4A (FIG. 4B) according to an example of the present disclosure.

FIG. 5A to FIG. 5F show evaluating of the power generation characteristics of ionic PDMS, generated voltages under various ionic liquid concentrations from 0 to 20 vol % in the PDMS (FIG. 5A), generated voltages of the ionic PDMS and a conventional TENG as a function of the thickness of each sample (FIG. 5B), generated voltages under various ionic liquid concentrations from 0 to 20 vol % as a function of the thickness of each sample (FIG. 5C), the durability of the ionic PDMS (insets are the generated voltages of the ionic PDMS on the first day and after 8 days) (FIG. 5D), generated currents and powers of the ionic PDMS under various external loads (FIG. 5E), and generated voltages under various contact frequencies from 0.5 to 4 Hz (FIG. 5F) according to an example of the present disclosure.

FIG. 6 shows a schematic diagram of power generation mechanism of the ionic PDMS according to an example of the present disclosure.

FIG. 7A to FIG. 7F show a schematic diagram of equivalent electrical circuit of the triboresistive sensing strip (FIG. 7A), photographs of the triboresistive sensing strip in the initial state (FIG. 7B (i)) and after being stretched by 50% (FIG. 7B (ii)), induced voltages measured by voltmeters ($V_1$ and $V_2$) connected to both ends of the sensor when the positions from TP #1 to TP #7 were touched (FIG. 7C), calculating the sensed position using the generated voltages (FIG. 7D), a photograph of an epidermal triboresistive sensor detecting touch position (scale bar: 5 cm) (FIG. 7E), and the triboresistive sensor which is capable of detecting holding, touching and detaching (FIG. 7F) according to an example of the present disclosure.

FIG. 8A to FIG. 8D show mechanical deformation of the triboresistive touch sensor, the sensor attached to a wrist (FIG. 8A), a state of the bending (FIG. 8B), stretching (FIG. 8C), and contraction (FIG. 8D) according to an example of the present disclosure.

FIG. 9A and FIG. 9B generated voltages (FIG. 9A) and sensed position by a touch (FIG. 9B) when TP #4 of the triboresistive sensor was touched by gloved finger at a random touch speed according to an example of the present disclosure.

FIG. 10 shows generated voltages by touching, detaching, and holding TP #1 and TP #7 of the triboresistive sensor according to an example of the present disclosure.

FIG. 11 shows sensed position when the triboresistive sensor was touched at intervals of 1 mm according to an example of the present disclosure.

FIG. 12 shows playing piano using the triboresistive sensor according to an example of the present disclosure.

FIG. 13A to FIG. 13F show a triboresistive controller for manipulation of a robot, a schematic diagram showing the robot operation procedure (FIG. 13A), the ionic PDMS was attached to the back of a hand (FIG. 13B), a robot gripper (FIG. 13C), demonstration of control of the gripper with various motions including "Move down" (FIG. 13D(i)), "Grip" (FIG. 13D(ii)), "Move up" (FIG. 13D(iii)), "Next page" (FIG. 13D(iv)), "Decrease roll" (FIG. 13D(v)), and "Release" (FIG. 13D(vi)), sensed position from (FIG. 13D (i) to FIG. 13D(vi)) (FIG. 13E), and actual position of robot gripper (FIG. 13F) according to an example of the present disclosure.

BEST MODE FOR CARRYING OUT THE INVENTION

Hereinafter, examples of the present disclosure will be described in detail with reference to the accompanying drawings so that the present disclosure may be readily implemented by those skilled in the art. However, it is to be noted that the present disclosure is not limited to the examples but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through this whole specification, a phrase in the form "A and/or B" means "A or B, or A and B".

Hereinafter, the present disclosure will be described in more detail with reference to exemplary embodiments. However, the present disclosure is not limited to these exemplary embodiments.

A first aspect of the present disclosure provides a triboresistive touch sensor, including a conductor in which electrification and electrostatic induction are caused by an external touch; and at least two voltmeters or ammeters provided at corners of the conductor.

In an embodiment of the present disclosure, a position of the external touch may be recognized based on a ratio of voltages or currents which are measured at the voltmeters or the ammeters, respectively, by the external touch.

In an embodiment of the present disclosure, a surface of the conductor may be electrified by the external touch to occur the electrostatic induction. Voltages or currents may be induced by the electrostatic induction at the voltmeters or the ammeters, respectively. The voltages or currents induced at the voltmeters or the ammeters, respectively, may be inversely proportional to a distance between the position of the external touch and the voltmeters or the ammeters.

In an embodiment of the present disclosure, in the conductor, an internal resistance may be generated between the position of the external touch and each of the voltmeters or the ammeters, and the internal resistance may be greater than a resistance (external resistance) generated at each of the voltmeters or the ammeters.

In an embodiment of the present disclosure, the conductor may be an ionic conductive conductor or an electron transfer-based conductor, but may not be limited thereto. Specifically, the ionic conductive conductor may be a polymer containing an ionic liquid and the electron transfer-based conductor may include at least one selected from silver nanowires and carbon nanotubes, but may not be limited thereto. That is, the conductor may refer to a material that has conductivity and also has a certain level of resistance.

In an embodiment of the present disclosure, the ionic conductive conductor may be an ionic conductive polymer, including a polymer compound modified with a hydrophilic functional group; and an ionic liquid containing an anion and a cation modified with a hydrophobic functional group.

In an embodiment of the present disclosure, miscibility of the polymer compound and the ionic liquid may be improved by hydrogen bonding between the hydrophilic function group and the anion, van der Waals interaction between the polymer compound and the cation, or both of them. A raw material of the polymer compound is intrinsically hydrophobic and thus has very low miscibility with the ionic liquid. Thus, when the raw material of the polymer compound is mixed with the ionic liquid, the mixture may be heterogeneous and opaque and may not have ionic conductivity. In an embodiment of the present disclosure, the polymer compound is modified with a hydrophilic functional group and the cation of the ionic liquid is modified with a hydrophobic functional group, and, thus, the hydrophilic functional group forms hydrogen bonding with the anion of the ionic liquid and a hydrophobic part of the polymer compound makes van der Waals interaction with the cation of the ionic liquid modified with a hydrophobic functional group. Therefore, when the polymer compound is mixed with the ionic liquid, the polymer compound can have high miscibility, homogeneity, transparency and ionic conductivity.

In an embodiment of the present disclosure, a raw material of the polymer compound may include at least one selected from polyurethane, PDMS (poly(dimethylsiloxane)) and an acrylate-based elastomer, but may not be limited thereto. Specifically, the raw material of the polymer compound may include polyurethane, PDMS and an acrylate-based elastomer, and its main chain, side chain or both chains may be modified with a hydrophilic functional group.

In an embodiment of the present disclosure, the hydrophilic functional group may include at least one selected from -OH (hydroxy group), —COO (ester group) and —NH$_2$, but may not be limited thereto.

In an embodiment of the present disclosure, the polymer compound modified with the hydrophilic functional group may contain at least one hydrophilic functional group per monomer. Specifically, the polymer compound modified with the hydrophilic functional group may contain at least one, at least two, at least three, at least four, at least five, or at least six hydrophilic functional group per monomer, but may not be limited thereto.

In an embodiment of the present disclosure, the polymer compound modified with the hydrophilic functional group may be represented by the following Chemical Formula 1:

[Chemical Formula 1]

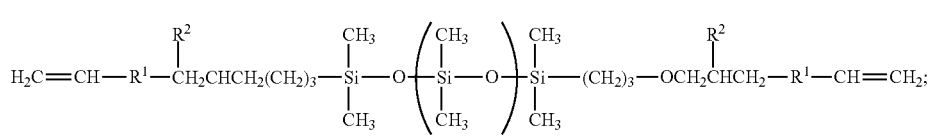

R¹ may include at least one selected from —COH and —COO, and R² may include at least one selected from —OH, —COO and —NH₂.

In an embodiment of the present disclosure, the cation modified with the hydrophobic functional group may be represented by the following Chemical Formula 2:

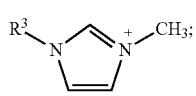

[Chemical Formula 2]

R³ may be a linear or branched alkyl group having 2 to 16 carbon atoms.

In an embodiment of the present disclosure, R³ may be a linear or branched alkyl group having 2 to 16, 3 to 16, 4 to 16, 5 to 16, 6 to 16, 2 to 15, 3 to 15, 4 to 15, 5 to 15, 6 to 15, 2 to 14, 3 to 14, 4 to 14, 5 to 14, 6 to 14, 2 to 13, 3 to 13, 4 to 13, 5 to 13, 6 to 13, 2 to 12, 3 to 12, 4 to 12, 5 to 12, or 6 to 12 carbon atoms.

In an embodiment of the present disclosure, as the number of carbon atoms of R³, the force of the van der Waals interaction may increase.

In an embodiment of the present disclosure, the anion may include at least one selected from [TFSI]⁻([N(SO₂CF₃)₂]⁻), [PF₆]⁻, [BF₄]⁻ and [CF₃SO₃]⁻, but may not be limited thereto.

In an embodiment of the present disclosure, a content of the ionic liquid may be about 0.001 vol % to about 100 vol % based on a volume of the ionic conductivity polymer, but may not be limited thereto. Specifically, the content of the ionic liquid may be about 0.001 vol % to about 100 vol %, about 0.001 vol % to about 50 vol %, about 0.001 vol % to about 30 vol %, about 0.001 vol % to about 25 vol %, about 0.001 vol % to about 20 vol %, about 0.1 vol % to about 100 vol %, about 0.1 vol % to about 50 vol %, about 0.1 vol % to about 30 vol %, about 0.1 vol % to about 25 vol %, about 0.1 vol % to about 20 vol %, about 1 vol % to about 100 vol %, about 1 vol % to about 50 vol %, about 1 vol % to about 30 vol %, about 1 vol % to about 25 vol %, or about 1 vol % to about 20 vol % based on the volume of the ionic conductivity polymer, but may not be limited thereto. In an embodiment of the present disclosure, as a particularly preferred range, the content of the ionic liquid may be about 1 vol % to about 30 vol % based on the volume of the ionic conductive polymer. A production of the electric power (i.e., the amount of electrostatic power) may vary depending on the volume content of the ionic liquid. When the volume content of the ionic liquid is greater than about 30 vol % based on the volume of the ionic conductive polymer, plasticity of the ionic conductive polymer increases excessively. Thus, it is difficult to maintain the morphology of the ionic conductive polymer and the surface of the ionic conductive polymer becomes sticky. When the volume content of the ionic liquid is smaller than about 1 vol % based on the volume of the ionic conductive polymer, the effect of electrostatic induction decreases, and, thus, the amount of electrostatic power decreases. The appropriate vol % of the ionic liquid may vary depending on the kind of the ionic liquid. For example, if the ionic liquid is 1-ethyl-3-methyl-imidazolium bis(trifluoromethylsulfonyl)imide ([EMIM]⁺[TFSI]⁻), an alkyl chain length may be shorter and the appropriate vol % for the same amount of electrostatic power may be lower than where the ionic liquid is 1-dodecyl-3-methylimidazolium bis(trifluoromethylsulfonyl)imide ([DMIM]⁺[TFSI]⁻).

In an embodiment of the present disclosure, a thickness of the ionic conductive polymer may be about 10 nm to about 100 mm, but may not be limited thereto. Specifically, the thickness of the ionic conductive polymer may be about 10 nm to about 100 mm, about 1 μm to about 100 mm, about 10 μm to about 100 mm, about 30 μm to about 100 mm, about 50 μm to about 100 mm, about 100 μm to about 100 mm, about 200 μm to about 100 mm, about 300 μm to about 100 mm, about 400 μm to about 100 mm, about 500 μm to about 100 mm, about 10 nm to about 50 mm, about 1 μm to about 50 mm, about 10 μm to about 50 mm, about 30 μm to about 50 mm, about 50 μm to about 50 mm, about 100 μm to about 50 mm, about 200 μm to about 50 mm, about 300 μm to about 50 mm, about 400 μm to about 50 mm, about 500 μm to about 50 mm, about 10 nm to about 10 mm, about 1 μm to about 10 mm, about 10 μm to about 10 mm, about 30 μm to about 10 mm, about 50 μm to about 10 mm, about 100 μm to about 10 mm, about 200 μm to about 10 mm, about 300 μm to about 10 mm, about 400 μm to about 10 mm, about 500 μm to about 10 mm, about 10 nm to about 5 mm, about 1 μm to about 5 mm, about 10 μm to about 5 mm, about 30 μm to about 5 mm, about 50 μm to about 5 mm, about 100 μm to about 5 mm, about 200 μm to about 5 mm, about 300 μm to about 5 mm, about 400 μm to about 5 mm, about 500 μm to about 5 mm, about 10 nm to about 3 mm, about 1 μm to about 3 mm, about 10 μm to about 3 mm, about 30 μm to about 3 mm, about 50 μm to about 3 mm, about 100 μm to about 3 mm, about 200 μm to about 3 mm, about 300 μm to about 3 mm, about 400 μm to about 3 mm, or about 500 μm to about 3 mm. In an embodiment of the present disclosure, as a particularly preferred range, the thickness of the ionic conductive polymer may be about 1 μm to about 50 mm. When the thickness of the ionic conductive polymer is less than about 1 μm, a resistance of the ionic conductive polymer increases to be equal to or higher than an appropriate level. Thus, the effect of electrostatic induction may decrease. When the thickness of the ionic conductive polymer is more than about 50 mm, a resistance of the ionic conductive polymer decreases, and, thus, the effect of electrostatic induction may increase. However, since the ionic conductive polymer is excessively increased in thickness, it cannot be applied in the fields requiring stretchability.

In an embodiment of the present disclosure, the vol % (ion concentration) of the ionic liquid at which the amount of electrostatic power is maximized may vary depending on the thickness of the ionic conductive polymer. Specifically, as the thickness of the ionic conductive polymer increases, the resistance decreases at the same ion concentration. Thus, the effect of electrostatic induction may increase. Therefore, as the thickness increases, a decrease in content of the ionic liquid may be preferable for sensing ability. However, an excessive decrease in content of the ionic liquid may cause a decrease in amount of electrostatic power. Meanwhile, when the ionic conductive polymer has a small thickness, the resistance increases and the effect of electrostatic induction may decrease, which may cause degradation in sensing ability. Therefore, the content of the ionic liquid needs to be increased. However, an excessive increase in content of the ionic liquid may inhibit electrification and the production of electric power may decrease. Accordingly, the thickness of the ionic conductive polymer and the content of the ionic liquid need to be appropriately adjusted to achieve the desired effect of the present disclosure.

In an embodiment of the present disclosure, an average transmittance of the ionic conductive polymer may be about 65% or more at a wavelength of about 400 nm to about 800 nm, but may not be limited thereto. Specifically, the average transmittance of the ionic conductive polymer may be about 65% or more, about 68% or more, about 70% or more, about 80% or more, about 90% or more, or about 99% or more at the wavelength of about 400 nm to about 800 nm. In an embodiment of the present disclosure, the average transmittance of the ionic conductive polymer may be about 90% or more at a wavelength of about 550 nm, but may not be limited thereto.

In an embodiment of the present disclosure, a touch resolution of the triboresistive touch sensor may be less than about 1 mm. In an embodiment of the present disclosure, the touch resolution of the triboresistive touch sensor may be less than about 1 mm, less than about 0.1 mm or less than about 0.01 mm. Herein, the present description specifies that the triboresistive touch sensor can sense a touch even at a touch resolution of less than 1 mm, but the triboresistive touch sensor having a touch resolution of about 1 mm or more is not excluded from the scope of the present disclosure.

In an embodiment of the present disclosure, the triboresistive touch sensor may recognize a presence, an absence and/or a holding state of the touch. In an embodiment of the present disclosure, the presence or absence state of the touch may include a touched state, an untouched state and a detached (separated) state after a touch. In an embodiment of the present disclosure, the holding state of the touch may refer to a state from the time point of touch to the time point of detachment.

In an embodiment of the present disclosure, the triboresistive touch sensor may recognize at least one touch(es). In an embodiment of the present disclosure, the triboresistive touch sensor may recognize touches at one or more touch positions simultaneously or sequentially. In an embodiment of the present disclosure, the triboresistive touch sensor may recognize at least one the presence, absence and/or holding state(s) of the touch.

In an embodiment of the present disclosure, the triboresistive touch sensor may maintain its original touch sensing capability even when it is stretched by up to maximum about 100% of its original. In an embodiment of the present disclosure, the triboresistive touch sensor may maintain its original touch sensing capability even when it is stretched by up to maximum about 100%, about 90%, about 80%, about 70%, about 60%, or about 50% of its original.

In an embodiment of the present disclosure, the touch sensing capability may be maintained until a strain of about 100% or less based on its original is applied to the ionic conductive polymer, or as a resistance in the ionic conductive polymer increases, contact distortion depending on the resistance ratio can be solved, and, thus, the touch sensing capability may be improved.

In an embodiment of the present disclosure, the triboresistive touch sensor may further include an insulator layer on the conductor. Specifically, in the triboresistive touch sensor of the present disclosure, the conductor having a monolayered structure can sense a touch position. Also, even when the triboresistive touch sensor further includes the insulator layer on the conductor to expand its application field, it can sense a touch position. Therefore, a touch can be made by a conductor such as a hand. In an embodiment of the present disclosure, the insulator layer may be a raw material of the polymer compound through which ions cannot penetrate, but may not be limited thereto.

In an embodiment of the present disclosure, the triboresistive touch sensor may be used as a sensor for a human skin-mountable touch sensor, but may not be limited thereto.

Hereinafter, example embodiments are described in more detail by using Examples, but the present disclosure may not limited to the Examples.

MODE FOR CARRYING OUT THE INVENTION

Examples

FIG. 1A (i) and FIG. 1A (ii) show schematic diagrams of a structure (FIG. 1A (i)) and working mechanism (FIG. 1A (ii)) of conventional triboelectric nanogenerators (TENGs).

FIG. 1B (i) and FIG. 1B (ii) show schematic diagrams of a structure (FIG. 1B (i)) and working mechanism (FIG. 1B (ii)) of a triboresistive touch sensor according to an embodiment of the present disclosure.

Example 1: Production of Ionic Conductive PDMS

To produce an ionic conductive PDMS, (1) the inventors selected candidate PDMS species which include an appropriate polar functionalized group, such as an ester or hydroxyl group, to enable hydrophilization of PDMS, thus resulting in strong interactions with ionic liquid (IL), and (2) investigated the use of the alkyl chain in the ionic liquid imidazolium to obtain enhanced compatibility with an innately hydrophobic PDMS species.

First, to find out the appropriate PDMS that enables hydrogen bonding (H-bonding) by introducing a polar functional group, an association test between functionalized PDMS and 1-ethyl-3-methylimidazolium bis(trifluoromethylsulfonyl)imide ([EMIM]$^+$[TFSI]$^-$) was conducted. The inventors expected our system to be fully stabilized through H-bonding between the –OH group in 3-Acryloxy-2-Hydroxypropoxypropyl) terminated Polydimethylsiloxane (DMS-U21) and the –CF$_3$ group in bis(trifluorosulfonyl) imide ([TFSI]$^-$) in IL. However, the inventors confirmed that the mixtures of DMS-U21 and [EMIM]$^+$[TFSI]$^-$ were not fully homogenous or sufficiently translucent. Thus, it was necessary to design an additional interaction to obtain fully homogeneous mixtures of DMS-U21 containing IL. Reportedly, as the concentration of the alkyl chain in imidazolium base IL increases, local dynamic heterogeneities are observed. These local dynamic heterogeneities between alkyl chains in IL are induced by Van der Waals interactions when the number of alkyl chain carbons exceeds 6. The inventors assume that the nano-domains separated by alkyl chains in [C$_n$MIM]$^+$[TFSI]$^-$ may have induced Van der Waals interactions with dimethyl siloxane units in PDMS to enhance the compatibility with DMS-U21.

To verify this assumption, the inventors arranged three candidate PDMSs with four kinds of 1-alkyl-3-methylimidazolium bis(trifluorosulfonyl)imide ([C$_n$MIM]$^+$[TFSI]$^-$, n=2, 4, 6, and 12) with different alkyl chain lengths (n), which are 1-ethyl-3-methyl-imidazolium bis(trifluorosulfonyl)imide ([EMIM]$^+$[TFSI]$^-$ or [C$_2$MIM]$^+$[TFSI]$^-$), 1-butyl-3-methyl-imidazolium bis(trifluorosulfonyl)imide ([BMIM]$^+$[TFSI]$^-$ or [C$_4$MIM]$^+$[TFSI]$^-$), 1-hexyl-3-methyl-imidazolium bis(trifluorosulfonyl)imide, ([HMIM]$^+$[TFSI]$^-$ or [C$_6$MIM]$^+$[TFSI]$^-$) and 1-dodecyl-3-methyl-imidazolium bis(trifluorosulfonyl)imide ([DMIM]$^+$[TFSI]$^-$ or [C$_{12}$MIM]$^+$[TFSI]$^-$) in FIG. 2A. Then, the inventors performed an intuitive mixing test to prepare the compounds, each of which consists of (I) Sylgard™ 184, (II) DMS-R11, and (II) DMS-U21 blended with 10 vol % [DMIM]$^+$[TFSI]$^-$, as shown by the photographs and magnified optical spectroscopic images in FIG. 2B (i) to FIG. 2B (iii). As a result, only one combination, (II) DMS-U21 mixed with 10 vol % [DMIM]$^+$[TFSI]$^-$, showed clear and transparent images. Phase separation was observed in both (I) Sylgard* 184 and (II) DMS-R$^{11}$ blended with [DMIM]$^+$[TFSI]$^-$. When a strong interaction exists (i.e. H-bonding), the domains segregated by alkyl chains in [DMIM]$^+$[TFSI]$^-$ assist in improving the degree of compatibility between the polymer and IL by introducing Van der Waals interactions.

A detailed method of producing a sample of the ionic conductive PDMS is as follows.

Production of DMS-U21 sample: 3 mL DMS-U21, 333 μL of [C$_n$MIM]$^+$[TFSI]$^-$ (n=2, 4, 6 and 12), 737.5 μL of (pentaerythritol tetrakis (3-mercaptopropionate) (PETMP) and 20 μL of 0.1 M benzoin ethyl ether (BEE) were dissolved in acetone to prepare precursor solutions. Each of the precursor solutions was poured into a mold and cured for 24 hours in an oven at 60° C. and then cured for 2 hours by irradiating UV light. Thereafter, the resultant products were kept for 6 hours in a desiccator to remove acetone.

Production of DMS-R$^{11}$ sample: 3 mL of DMS-R11, 333 μL of [C$_n$MIM]$^+$[TFSI]$^-$ (n=2, 12) and 20 μL of 0.1 M BEE were dissolved in acetone to prepare precursor solutions. Each of the precursor solutions was poured into a mold and cured for 2 hours by irradiating UV light. Then, the resultant products were kept for 6 hours in a desiccator to remove acetone.

Production of Sylgard® 184 sample: 2.7 mL of Sylgard® 184 base, 0.27 ml of a curing agent and 333 μl of [C$_n$MIM]$^+$[TFSI]$^-$ (n=2, 12) were mixed to prepare a mixture. The mixture was cured for 24 hours in an oven at 60° C.

Example 2: Evaluation of Properties of Ionic Conductive PDMS

The evidence of H-bonding and the effect of the alkyl chain length of imidazolium on miscibility with DMS-U21 were investigated by UV-Vis spectroscopy (UV-Vis), Fourier transform infrared spectroscopy (FT-IR) and differential scanning calorimetry (DSC). As the number of carbons in the alkyl chain of [C$_n$MIM]$^+$ increased, the tendency of transmittance of the mixtures of DMS-U21 and [C$_n$MIM]$^+$[TFSI]$^-$ approached 96.53% at 550 nm (FIG. 2C). When DMS-U21 was blended with [HMIM]$^+$[TFSI]$^-$ or [DMIM]$^+$[TFSI]$^-$, the transmittance of each mixture was comparable to that of pure DMS-U21. However, the transmittance was lowered to 76.75 and 66.51% when n≤4 in [C$_n$MIM]$^+$ (i.e. [BMIM]$^+$ and [EMIM]$^+$, respectively). Specifically, an ionic conductive elastomer containing 10 vol % [C$_n$MIM]$^+$[TFSI]$^-$ exhibited an average transmittance of 99% or more in case of [DMIM]$^+$[TFSI]$^-$ and [HMIM]$^+$[TFSI]$^-$ an average transmittance of about 78% or more in case [BMIM]$^+$[TFSI]$^-$ and an average transmittance of about 68% or more in case of [EMIM]$^+$[TFSI]$^-$ in a wavelength range of from 400 nm to 900 nm.

Referring to FIG. 2D, the characteristic stretching band located at 3446.07 cm$^{-1}$ was assigned to the -OH functional group in pure DMS-U21. In addition, the stretching band located at 1194.35 cm$^{-1}$ was assigned to the —CF$_3$ group in pure [C$_n$MIM]$^+$[TFSI]$^-$ in IL. Upon the addition of [C$_n$MIM]$^+$[TFSI]$^-$, the band located at 3446.07 cm 1 shifted to lower wavenumber, and the band located at 1194.35 cm 1 shifted to higher wavenumber, which indicates that H-bonding occurred between the polymer and [TFSI]$^-$ of the ionic liquid (FIG. 2D and FIG. 3). Therefore, it was confirmed that the presence of longer alkyl chains in [C$_n$MIM]$^+$ supports compatibility between DMS-U21 and [C$_n$MIM]$^+$[TFSI]$^-$ due to van der Waals interaction.

Also, direct evidence of plasticizing effect was observed from DSC. Referring to FIG. 2E, the glass transition temperature (T$_g$) of each sample was lowered from −46.06° C. to −57.34° C. upon the addition of 10 vol % [C$_n$MIM]$^+$[TFSI]$^-$ in accordance with the increase in alkyl chain length. This proved that the alkyl chain length in imidazolium is critical for the degree of miscibility with DMS-U21. The presence of an appropriate plasticizing effect induced by ILs was confirmed by the results of the uni-axial tensile test. By tuning the volume ratio of ionic liquid ([DMIM]$^+$[TFSI]) to polymer (DMS-U21), a series of complex materials with improved compatibility and distinct mechanical properties were obtained.

Referring to FIG. 2F, upon increasing the content of [DMIM]$^+$[TFSI]-up to 20 vol %, the material showed lower Young's modulus, greater stretchability and lower maximum fracture stress. In comparison with Sylgard" 184 elastomer, the Young's modulus was lower, in the range of 223.1 to 26.8 kPa, while the rupture strain ($\varepsilon_c$) was in the range of 2.67 to 4.87, making the material sufficiently adaptable to skin due to softening of the samples through the plasticizing effect. In addition, all samples exhibited a transmittance of greater than 96% under a wide range of [DMIM]$^+$[TFSI]$^-$ concentrations from 2.5 vol % to 20 vol %.

The 10 vol % [DMIM]$^+$[TFSI]$^-$ ionic PDMS exhibited various hysteresis behaviors under a strain of from 0.5 to 3 (stretch of 1.5, 2.0, 2.5, 3.0, 3.5 and 4.0) on the loading-unloading test (FIG. 4A). As a result, a resilience of the sample at a specific stretch was checked, and the sample exhibited a resilience of 99% at a stretch of 1.5. Also, the residual strain (plastic strain) was calculated as the ratio between $\varepsilon_{residual}$ and $\varepsilon_{applied}$ as a function of cycle number (FIG. 4B). When loading-unloading was performed once up to a stretch of 4, the plastic strain was 20%. The 10 vol % [DMIM]$^+$[TFSI]$^-$ ionic PDMS exhibited a very resilient behavior for strains below 1. Further, in a 1000-cycle loading-unloading test, the resilience was 99.0% at a strain of 0.5 (i.e., at a stretch of 1.5), which confirmed that the sample had stability without a significant strain even when used repeatedly (FIG. 2G). (The average resilience for 50 cycles was 99.1%.)

Referring to FIG. 2H, the compound with DMS-U21 and [DMIM]$^+$[TFSI]$^-$ is clear and transparent without phase separation, indicating excellent compatibility. The components are thoroughly homogeneous thanks to ion-dipole and Van der Waals interactions. The ion-dipole interactions are induced by introduction of the hydroxyl and ester groups on PDMS and the cations in ILs. Further, the Van der Waals interactions are confirmed by the filling of the alkyl chains on imidazolium in ILs with dimethylsiloxane units.

Example 3: Electric Power Generation of Ionic Conductive PDMS

To experimentally investigate the power generation capability of PDMS, a pushing tester was used to provide consistent vertical contacts. Referring to FIG. 5A, when bare PDMS was touched, a negligible amount of voltage was generated due to the absence of a conducting layer, causing poor electrostatic induction. To endow the PDMS with electrostatic induction capability without inserting an additional conducting layer, ions can be introduced into the PDMS, as described in Example 1 (FIG. 6). [DMIM]$^+$[TFSI]$^-$ was introduced at up to 10 vol %. The generated voltage was dramatically increased from about 0 to 250 $V_{pp}$. The stable addition of [DMIM]⁺[TFSI]⁻ allowed the PDMS to act as not only a dielectric layer for contact electrification but also an ion conducting layer for electrostatic induction without a stack of conductive layers required for a conventional electrostatic power generation device. Meanwhile, the addition of further ionic liquid from 10 vol % to 20 vol % caused the generated voltage to decrease, which is possibly a result of reduced contact electrification capability due to a decrease in the PDMS content. PDMS containing 10 vol % ionic liquid has a specific resistance of 3.94 kΩm and an electrical conductivity of 0.25 mS/m. The specific resistance and electrical conductivity were changed depending on the content of the ionic liquid as follows: 20 vol %: 0.84 kΩm, 1.2 mS/m, 5 vol %: 13.3 kΩm, 0.075 mS/m, 2.5 vol % 37.7 kΩm, 0.026 mS/m, and 1 vol %: 102.3 kΩm, 0.0097 mS/m.

The effect of thickness on voltage generation was also investigated (FIG. 5B). A conventional TENG device composed of 50 μm-thick PDMS assembled on a conducting layer generated a voltage of 700 $V_{pp}$, which is markedly higher than the voltages generated by the ionic PDMS. However, increasing the thickness of the PDMS of the TENG device from 50 μm to 3 mm decreased the voltage generation from 700 $V_{pp}$ to 350 $V_{pp}$. This is because thicker dielectric layers impede the transmittance of electric fields from objects to the conducting layer, resulting in a reduction in electrostatic induction. Meanwhile, because the ions in ionic PDMS act as a medium to transmit an electric field, the thickness of ionic PDMS barely affects electric field transmission. Rather, increasing the thickness of ionic PDMS enhances conductance, which could maximize the effect of electrostatic induction. When the thickness of ionic PDMS was increased from 50 μm to 3 mm, the generated voltage notably rose from about 100 $V_{pp}$ to 600 $V_{pp}$. The effect of thickness on the generated voltage was investigated under various ionic liquid concentrations from 0 to 20% (FIG. 5C). When the thickness of ionic PDMS was micron-scale, the maximum power generation occurred at an ion concentration of 10%. On the other hand, as the thickness of ionic PDMS approached the millimeter (mm) scale, the maximum voltage generation point was shifted to lower ion concentration of 2.5%. This is possibly due to the increased PDMS content, which may have resulted in greater contact electrification. The findings indicate that thickness and ionic concentration can be optimized according to each particular application.

Referring to FIG. 5D, after 8 days in a desiccator, the weight of the ionic PDMS was negligibly changed and its voltage generation capability at the initial state was maintained. Furthermore, the voltage generation capacity rarely degraded during 50,000 consecutive contacts. In the conventional TENG that employs a hydrogel as a conductive layer, water evaporates, and, thus, the durability is degraded. However, the ionic PDMS is solvent-free and maintains transparency and stretchability. To investigate the maximum power generation of the ionic PDMS, generated current was measured under a wide range of external loads from 0.5 MΩ to 5 GQ (FIG. 5E). At an external load of 150 MΩ, the ionic PDMS generated a maximum power of 0.42 mW/cm². The peak of generated power can be affected by contact speed. The generated voltage gradually decreased as the contact frequency decreased from 4 Hz to 1 Hz (FIG. 5F). However, a notable voltage of 100 $V_{pp}$ was still measured at 0.5 Hz. Gentle touch readily generated electrical energy (about 68 $V_{pp}$) and directly turned on nine green LEDs connected in series.

Example 4: Implementation of Triboresistive Touch Sensor

Based on electric power generation mechanism (FIG. 6), the ionic PDMS can be directly used for touch position recognition by comparing the generated voltages measured on each side. The electric power generation mechanism caused by touch occurs through (①) the initial state, (②) contact electrification where electrons are exchanged between an external touch object and the ionic conductive elastomer when contact is made, and (③), (④) electrostatic induction where ions in the elastomer are rearranged due to changes in intensity of an electric field applied to the elastomer when the external touch object is touched and detached from the elastomer, and, thus, electrons are induced from an external ground or pushed. The internal parts of the ionic PDMS can be represented by two resistive parts from the touch point to each side (FIG. 7A). The voltage induced at each of voltmeters V1 and V2 is inversely proportional to a resistance caused by the distance between the touch point to data lines (wires, meters, probes) at each side. The induced voltages can be represented by the following Equations 1 and 2:

$$V_1 \approx \frac{R_2 + R_{ex}}{R_1 + R_2 + 2R_{ex}} R_{ex} I_t = (1-\alpha) I_t R_{ex} \quad \text{[Equation 1]}$$

$$V_2 \approx \frac{R_1 + R_{ex}}{R_1 + R_2 + 2R_{ex}} R_{ex} I_t = \alpha I_t R_{ex} \quad \text{[Equation 2]}$$

$V_1$ and $V_2$ are the peak-to-peak induced voltages measured by the voltmeters $V_1$ and $V_2$, respectively; It is the total induced current; $R_1$ and $R_2$ are the resistances between the touch position and the respective sides; $R_{ex}$ is the total resistance of the external load and the voltmeter; and a is the normalized distance from the touch point to the left end of the ionic PDMS. The touch position can be interpreted based on the following Equation 3:

$$\alpha = \frac{V_2}{V_1 + V_2} \quad \text{[Equation 3]}$$

After touch on seven touch positions (touch points; TP) TP #1 to TP #7 in the ionic PDMS (the distance between two positions was 8.8 mm), the generated voltages were measured by the voltmeters $V_1$ and $V_2$ (FIG. 7B (i) and FIG. 7B (ii)). The ionic PDMS is intrinsically stretchable, and, thus, the sensing capability was measured after it was pulled with the same amount of force at both ends and stretched by up to 50%. The induced voltages corresponding to the respective touch positions are shown in FIG. 7C. The voltages measured from the respective sides were inversely proportional to the distance from the touch position. During touch from the position TP #1 to the position TP #7, the voltage induced at $V_1$ decreased and the voltage induced at $V_2$ increased based on Equations 1 and 2. When TP #4 was touched, voltage of similar levels were induced at the respective voltmeters, which indicates that a central portion of the ionic PDMS was touched. Based on Equation 3, the touch position was translated to the sensed position (FIG. 7D). Even though some distortion was observed, the calculated sensed position traced the touch position (a) during touch from the position TP #1 to the position TP #7. Based on equations 1 and 2, the distortion most likely occurred because the induced voltage is not only affected by $R_1$ and $R_2$, but also by $R_{ex}$. Furthermore, the nonlinearity of resistance in the ionic PDMS and contact resistance at the interfaces of the connected wires possibly result in some distortion. Thanks to the softness of the ionic PDMS, the sensing capability of the ionic PDMS could be investigated under stretched states. When the PDMS was stretched by up to 50%, the sensing capability was maintained; the distortion was even suppressed compared to that in the undeformed state (FIG. 7D). The resistance increased when stretch was applied, which contributed to an increase in the ratio of $R_1$ and $R_2$ to total resistance. Based on Eq. 1 and 2, increasing the ratio of $R_1$ and $R_2$ to total resistance can be an effective way to address distortion, given that a voltage is clearly measured at the external load. Meanwhile, the conventional TENG could not be used to measure the suggested sensing mechanism. In the case of touch position sensing based on conventional TENGs, the calculated sensed positions were similar when the sensor was touched from TP #1 to TP #7. The extremely low resistance ($10^7$ S/m (ref)) of the conventional conducting layer caused the ratio of $R_1$ and $R_2$ to total resistance to be negligible.

Because the triboresistive touch sensing mechanism relies on the ratio of voltages induced on each side, the magnitude of the generated voltage barely affects the sensing capability (FIG. 9A and FIG. 9B). Thanks to the softness of the ionic PDMS, it could be attached to a wrist with adhesive and easily deformed along with movement of the wrist (FIG. 8A to FIG. 8D). Moreover, the high transmittance of the ionic PDMS ensured that visual information could be conveyed through the ionic PDMS. The ionic PDMS mounted on the skin readily recognized touch positions from TP #1 to TP #7 (FIG. 7E). Because direction of voltages induced by touch is opposite compared to voltages induced by detach, the sensor readily perceived touch and detach movements. Holding could be also detected until the detaching signal was received (FIG. 7F). That is, the triboresistive touch sensor of the present disclosure can sense the presence or absence of a touch and a touch position and can also distinguish a holding state. Referring to FIG. 10, it can be seen that a signal is generated in a downward direction based on 0 V at the time of touch and a signal is generated in an upward direction (i.e., opposite to the direction of the touch signal) based on 0 V at the time of detachment. Therefore, the holding state may refer to a state from the time point when a touch signal is generated to the time point when a signal is generated in a direction opposite to that of the touch signal. Also, even when TP #1 is touched while the touch point TP #7 is touched and held, a voltage signal is still generated. Therefore, it can be seen that the triboresistive touch sensor can sense multi-touches and multi-holdings.

Further, the resolution (the degree of identifying touch positions) of the triboresistive touch sensor was evaluated. As a result of touch from 10 cm left to 10 cm right at an interval of about 1 mm based on the center of the triboresistive touch sensor, it was confirmed that the triboresistive touch sensor can recognize touch positions well (FIG. 11).

Example 5: Application of Triboresistive Touch Sensor

The integration with future application fields such as playing piano or robot gripper using the triboresistive touch sensor was also demonstrated.

FIG. 12 shows playing piano using the triboresistive touch sensor. The triboresistive touch sensor was attached to the wrist and served as a piano keyboard. It was confirmed that touch, holding and detachment triggered the corresponding sounds.

The ionic PDMS was directly utilized as a controller to manipulate a robot gripper. While the touch resolution of conventional TENG touch position sensors is limited by the number of arrays, the resolution of the triboresistive sensor of the present disclosure is determined by the relative voltages induced at each corner, resulting in high and flexible touch resolution. Referring to FIG. 13A, the ionic PDMS was divided into seven sections to control the movements of a robot, including roll, pitch, and yaw. Thanks to the flexible resolution of the sensor, the sections could be readily rearranged according to a given situation without any physical modification of the ionic PDMS. After rearranging the sensing sections from seven to nine, the position and gripping functions of the robot could be controlled as well. The voltages induced at each corner were measured when the sixteen sections were touched. The induced voltages were notably distinguishable according to touch sections, and could be interpreted to command sixteen movements of the robots. To demonstrate the use of an epidermal ionic PDMS as a controller, an ionic PDMS was attached to the back of a hand and connected with four wires (FIG. 13B). The ionic PDMS was used to control a robot as the robot gripped a leaning egg and conveyed it to a target spot (FIG. 13C). When a section near V2 was touched and held, both α and β were over 0.7, which commanded the robot to "move down" (i). To grip the egg, a section near V3 was touched and held. The presence of a clear detach signal avoided breaking the egg (ii). After delicately gripping the egg, the robots moved the egg up, which was done in response to the signals α<0.3 and β>0.7 (iii). To stand the leaning egg up, the "next page" section was touched (iv). The area and functions of each section were rearranged to allow the subject to manipulate the robot's orientation. After rolling the egg by touching the rearranged section near V3 (v), the egg was delicately conveyed to a target spot. Finally, the upright egg was released with a touch in the middle between $V_3$ and $V_4$, which corresponded to a signal of α ≈0.5 and β<0.35 (vi). FIG. 13E shows the positions recognized from (FIG. 13D(i) to FIG. 13D(vi)) as α and β on the y-axis, a represents the distance to the right from a reference point in the sensor and β represents the distance to the top from the reference point in the sensor. FIG. 13F shows the actual location of the robot gripper manipulated in (FIG. 13D(i) to FIG. 13D(vi)). Some slight sensing distortion was observed, which may have originated from unstable wire connections and the nonlinearity of the conduction path in the ionic PDMS (refs), but an improved calibration process may be able to compensate for such distortion.

Further, it was confirmed that even the ionic PDMS onto which non-modified PDMS is bonded can serve as a triboresistive touch sensor. Accordingly, it can be seen that the ionic PDMS according to Examples can be utilized as a triboresistive touch sensor in various fields.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A triboresistive touch sensor, comprising
a conductor in which electrification and electrostatic induction are caused by an external touch; and
at least two voltmeters or ammeters provided at corners of the conductor.

2. The triboresistive touch sensor of claim 1,
wherein a position of the external touch is recognized based on a ratio of voltages or currents which are measured at the voltmeters or the ammeters, respectively, by the external touch.

3. The triboresistive touch sensor of claim 1,
wherein a surface of the conductor is electrified by the external touch to occur the electrostatic induction,
wherein voltages or currents are induced by the electrostatic induction at the voltmeters or the ammeters, respectively,
wherein the voltages or currents induced at the voltmeters or the ammeters are inversely proportional to a distance between the position of the external touch and the voltmeters or the ammeters.

4. The triboresistive touch sensor of claim 1,
wherein the conductor is an ionic conductive conductor or an electron transfer-based conductor.

5. The triboresistive touch sensor of claim 4,
wherein the ionic conductive conductor is an ionic conductive polymer, including a polymer compound modified with a hydrophilic functional group; and an ionic liquid containing an anion and a cation modified with a hydrophobic functional group.

6. The triboresistive touch sensor of claim 5,
wherein miscibility of the polymer compound and the ionic liquid is improved by hydrogen bonding between the hydrophilic function group and the anion, van der Waals interaction between the polymer compound and the cation, or both of them.

7. The triboresistive touch sensor of claim 5,
wherein a raw material of the polymer compound includes at least one selected from polyurethane, PDMS (poly(dimethylsiloxane)) and an acrylate-based elastomer.

8. The triboresistive touch sensor of claim 5,
Wherein the hydrophilic functional group includes at least one selected from —OH, —COO and —NH$_2$.

9. The triboresistive touch sensor of claim 5,
wherein the cation modified with the hydrophobic functional group is represented by the following Chemical Formula 2:

[Chemical Formula 2]

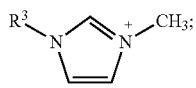

R$_3$ is a linear or branched alkyl group having 2 to 16 carbon atoms.

10. The triboresistive touch sensor of claim 5,
wherein the anion includes at least one selected from [TFSI]$^-$, [PF$_6$]$^{31}$, [BF$_4$]$^-$; and [CF$_3$SO$_3$]$^-$.

11. The triboresistive touch sensor of claim 5,
wherein a content of the ionic liquid is 0.001 vol % to 100 vol % based on a volume of the ionic conductivity polymer.

12. The triboresistive touch sensor of claim 5,
wherein a thickness of the ionic conductive polymer is 10 nm to 100 mm.

13. The triboresistive touch sensor of claim 5,
wherein an average transmittance of the ionic conductive polymer is 65% or more at a wavelength of 400 nm to 800 nm.

14. The triboresistive touch sensor of claim 1,
wherein a touch resolution of the triboresistive touch sensor is less than 1 mm.

15. The triboresistive touch sensor of claim 1,
wherein the triboresistive touch sensor recognizes a presence, an absence and/or a holding state of the touch.

16. The triboresistive touch sensor of claim 1,
wherein the triboresistive touch sensor recognizes at least one touch(es).

17. The triboresistive touch sensor of claim 1,
wherein the triboresistive touch sensor maintains its original touch sensing capability even when it is stretched by up to maximum 100% of its original.

18. The triboresistive touch sensor of claim 1,
further comprising an insulator layer on the conductor.

19. The triboresistive touch sensor of claim 1,
wherein the triboresistive touch sensor is used for a human skin-mountable touch sensor.

* * * * *